United States Patent
Yang et al.

(10) Patent No.: US 8,724,574 B2
(45) Date of Patent: May 13, 2014

(54) METHOD FOR TRANSMITTING CONTROL INFORMATION AND APPARATUS FOR SAME

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 13/380,968

(22) PCT Filed: Jul. 27, 2010

(86) PCT No.: PCT/KR2010/004910
§ 371 (c)(1),
(2), (4) Date: Dec. 27, 2011

(87) PCT Pub. No.: WO2011/013977
PCT Pub. Date: Feb. 3, 2011

(65) Prior Publication Data
US 2012/0106495 A1    May 3, 2012

Related U.S. Application Data

(60) Provisional application No. 61/228,952, filed on Jul. 27, 2009.

(30) Foreign Application Priority Data

Jul. 26, 2010 (KR) .................. 10-2010-0071839

(51) Int. Cl.
*H04W 4/00* (2009.01)
(52) U.S. Cl.
USPC ........................................ 370/329

(58) Field of Classification Search
USPC ......................................... 370/455
See application file for complete search history.

(56) References Cited

U.S. PATENT DOCUMENTS

| | | | |
|---|---|---|---|
| 2008/0219219 A1* | 9/2008 | Sartori et al. | 370/335 |
| 2008/0310360 A1 | 12/2008 | Heo et al. | |
| 2010/0002664 A1* | 1/2010 | Pan et al. | 370/338 |
| 2010/0098012 A1* | 4/2010 | Bala et al. | 370/329 |
| 2010/0182961 A1* | 7/2010 | Kim et al. | 370/329 |

FOREIGN PATENT DOCUMENTS

| | | |
|---|---|---|
| KR | 10-2007-0119963 A | 12/2007 |
| KR | 10-2008-0093319 A | 10/2008 |
| KR | 10-2008-0109579 A | 12/2008 |

* cited by examiner

*Primary Examiner* — Chi Pham
*Assistant Examiner* — Fahmida Chowdhury
(74) *Attorney, Agent, or Firm* — Birch, Stewart, Kolasch & Birch, LLP

(57) ABSTRACT

A method according to an embodiment includes receiving, from a base station, first component information for transmitting first channel information for a first frequency band; receiving, from the base station, second component information for transmitting second channel information for a second frequency band added to the first frequency band; transmitting the first channel information to the base station in accordance with the first component information; and transmitting the second channel information to the base station in accordance with the second component information. When the point of time of the transmission of the first channel information and the point of time of the transmission of the second channel information coincide with each other, either the first channel information or the second channel information is transmitted in accordance with a predetermined drop rule.

15 Claims, 21 Drawing Sheets

*CQI may be replaced with other downlink channel information (e.g., PMI or RI)

FIG. 8
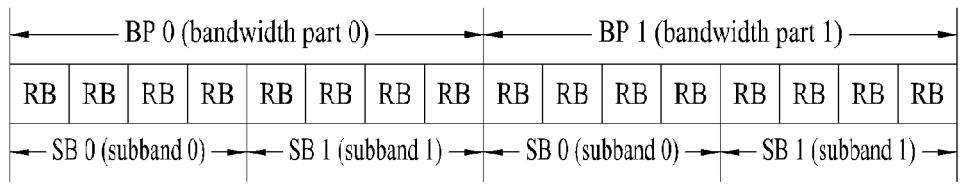
FIG. 9
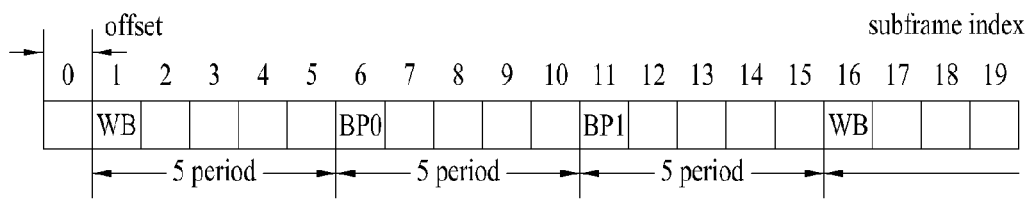
(a) Channel Quality Indicator(QCI)only
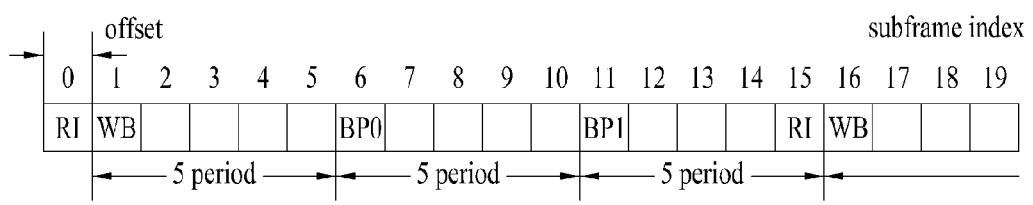
(b) CQI and Rank Indicator(RI)

*CQI may be replaced with other downlink channel information (e.g., PMI or RI)

*CQI may be replaced with other downlink channel information (e.g., PMI or RI)

*SRS may be replaced with another signal for uplink measurement

*SRS may be replaced with another signal for uplink measurement

METHOD FOR TRANSMITTING CONTROL INFORMATION AND APPARATUS FOR SAME

CROSS-REFERENCE TO RELATED APPLICATIONS

This application is the National Phase of PCT/KR2010/004910 filed on Jul. 27, 2010, which claims priority under 35 U.S.C. 119(e) to U.S. Provisional Application No. 61/228,952 filed on Jul. 27, 2009 and under 35 U.S.C. 119(a) to Patent Application No. 10-2010-0071839 filed in Republic of Korea on Jul. 26, 2010, all of which are hereby expressly incorporated by reference into the present application.

FIELD OF THE INVENTION

The present invention relates to a wireless communication system. And, more particularly, the present invention relates to a method for transmitting via uplink control information or a reference signal from an extended frequency resource region.

BACKGROUND ART

Wireless communication systems are evolving extensively in order to provide diverse types of communication services, such as audio and video data, and so on. Generally, a mobile communication system corresponds to a multiple access system that shares available system resource (e.g., bandwidth, transmission power, and so on) so as to be capable of supporting communication between multiple users. Examples of the multiple access system include a CDMA (code division multiple access) system, a FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on. In a wireless communication system, a user equipment may receive information from a base station via downlink (DL), and the user equipment may transmit information to the base station via uplink (UL). The information being transmitted or received by the user equipment may correspond to data and diverse control information. And, diverse physical channels may exist depending upon the type and purpose of the information being transmitted or received by the user equipment.

In a wireless communication system, since a channel between a transmitting end and a receiving end is not fixed, the channel between a transmitting antenna and a receiving antenna is constantly required to be measured. When a pre-arranged signal is exchanged between the transmitting end and the receiving end in order to measure the channel, a decreased amount of amplitude and a phase shift value may be determined, and such information may be transmitted as feedback to the transmitting end. Furthermore, by using this information, non-agreed data information may be reliably detected and decoded. Herein, the pre-arranged signal between the transmitting end and the receiving end may be referred to as a reference signal, a pilot signal, or a sounding reference signal.

As an example of a communication system to which the present invention may be applied, a 3GPP LTE ($3^{rd}$ Generation Partnership Project Long Term Evolution; hereinafter referred to as "LTE") communication system will now be broadly described.

FIG. 1 illustrates a general view of an E-UMTS network structure as an example of a communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE) (120), base stations (eNode B; eNB) (110a and 110b), and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ (Hybrid Automatic Repeat and reQuest). An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible, frequency band, simple structure and open interface, and adequate power consumption of the user equipment are being requested.

Recently, a standardization procedure for a succeeding (or subsequent) technology of the LTE has been under progress by the 3GPP. In the description of the present invention, the above-mentioned technology will be referred to as "LTE-Advanced" or "LTE-A". The essential difference between the LTE system and the LTE-A system is the system bandwidth. The LTE-A system aims to support a broadband of up to 100 MHz. For this, the LTE-A system encourages the use of a carrier aggregation (or bandwidth aggregation) technology, which achieves a broadband by using multiple component carriers. In order to use a wider (or broader) frequency band, the carrier aggregation (or bandwidth aggregation) uses a plurality of component carriers as a single large logical frequency band. The bandwidth of each frequency block may be defined based upon the bandwidth of a system block used in the LTE system. Each frequency block uses a component carrier in order to be transmitted. Multiple carriers may be used in combination with carrier aggregation and/or bandwidth aggregation.

DETAILED DESCRIPTION OF THE INVENTION

Technical Objects

An object of the present invention, which the present invention seeks to achieve, is to provide, a method for efficiently acquiring channel information of an extended resource region, when a frequency resource is extended in a wireless communication system.

Another object of the present invention is to provide a method for resolving contention, when a contention occurs between an uplink signal being transmitted through an extended resource region and an uplink signal being transmitted through the conventional (or initial) resource region.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the object of the present invention, according to an embodiment of the present invention, a method for transmitting control information of a user equipment comprises the steps of receiving first configuration information for transmitting first channel information respective to a first frequency band from a base station; receiving second configuration information for transmitting second channel information respective to a second frequency band from the base station, the second frequency band being added to the first frequency band; transmitting the first channel information to the base station based upon the first configuration information; and transmitting the second channel information to the base station based upon the second configuration information. At this point, in case a transmission point of the first channel information coincides with a transmission point of the second Channel information, only one of the two channel information may be transmitted in accordance with a predetermined dropping rule.

According to the embodiment of the present invention, based upon the predetermined dropping rule, in case a transmission point of the first channel information coincides with a transmission point of the second channel information, the second channel information may be dropped.

Also, according to the embodiment of the present invention, based upon the predetermined dropping rule, in case a transmission point of the first channel information coincides with a transmission point of the second channel information, based upon a comparison made between the first frequency band and the second frequency band, channel information of the smaller frequency band may be dropped.

Also, according to the embodiment of the present invention, based upon the predetermined dropping rule, in case a transmission point of the first channel information coincides with a transmission point of the second channel information, based upon a comparison made between a transmission cycle period of the first channel information and a transmission cycle period of the second channel information, channel information of the smaller transmission cycle period may be dropped.

Also, according to the embodiment of the present invention, based upon the predetermined dropping rule, in case a transmission point of the first channel information coincides with a transmission point of the second channel information, each channel information may be alternately dropped in subframe units.

In order to achieve the object of the present invention, according to another embodiment of the present invention, a method for transmitting control information of a user equipment in a wireless communication system includes the steps of receiving first configuration information for transmitting first channel information respective to a first frequency band from a base station; transmitting the first channel information to the base station based upon the first configuration information; and optionally transmitting second channel information respective to a second frequency band to the base station by applying the first configuration information, the second frequency band being added to the first frequency band. At this point, in case the second frequency band is adjacent to the first frequency band, the second channel information may be transmitted at the point when the first channel information is being transmitted.

According to the embodiment of present invention, the present invention may further include, when the second channel information is being transmitted, a step of transmitting index information respective to a subband of the first frequency band to the base station.

In order to achieve the object of the present invention, according to yet another embodiment of the present invention, a method for transmitting reference signals of a user equipment in a wireless communication system includes the steps of receiving first configuration information for transmitting a first reference signal respective to a first frequency band from a base station; receiving second configuration information for transmitting a second reference signal respective to a second frequency band from the base station, the second frequency band being added to the first frequency band; transmitting the first reference signal to the base station based upon the first configuration information; and transmitting the second reference signal to the base station based upon the second configuration information. At this point, in case a transmission point of the first reference signal coincides with a transmission point of the second reference signal, only one of the two reference signals is transmitted in accordance with a predetermined dropping rule.

According to the embodiment of the present invention, based upon the predetermined dropping rule, in case a transmission point of the first reference signal coincides with a transmission point of the second reference signal, the second reference signal may be dropped.

Also, according to the embodiment of the present invention, based upon the predetermined dropping rule, in case a transmission point of the first reference signal coincides with a transmission point of the second reference signal, based upon a comparison made between the first frequency band and the second frequency band, a reference signal of the smaller frequency band may be dropped.

Also, according to the embodiment of the present invention, based upon the predetermined dropping rule, in case a transmission point of the first reference signal coincides with a transmission point of the second reference signal, based upon a comparison made between a transmission cycle period of the first reference signal and a transmission cycle period of the second reference signal, a reference signal of the smaller transmission cycle period may be dropped.

Also, according to the embodiment of the present invention, based upon the predetermined dropping rule, in case a transmission point of the first reference signal coincides with a transmission point of the second reference signal, each reference signal may be alternately dropped in subframe units.

In order to achieve the object of the present invention, according to yet another embodiment of the present invention, a method for transmitting reference signals of a user equipment in a wireless communication system includes the steps of receiving first configuration information for transmitting a first reference signal respective to a first frequency band from a base station; transmitting the first reference signal to the base station based upon the first configuration information; and optionally transmitting a second reference signal respective to a second frequency band to the base station by applying the first configuration information, the second frequency band being added to the first frequency band. Herein, in case the second frequency band is adjacent to the first frequency band, the second reference signal may be transmitted at the point when the first reference signal is being transmitted.

In order to achieve the object of the present invention, according to yet another embodiment of the present invention, a user equipment in a wireless communication system includes a reception module configured to receive a radio signal; a transmission module configured to transmit a radio signal; and a processor configured to generate first channel information based upon first configuration information for transmitting the first channel information respective to a first frequency band, the first frequency band being received from a base station through the reception module, and to generate second channel information based upon second configuration information for transmitting the second channel information respective to a second frequency band, the second frequency band being added to the first frequency band. Herein, in case a transmission point of the first channel information coincides with a transmission point of the second channel information, the processor may transmit only one of the two channel information in accordance with a predetermined dropping rule. And, the processor may transmit at least one of the first channel information and the second channel information to the base station through the transmission module.

In order to achieve the object of the present invention, according to yet another embodiment of the present invention, a user equipment in a wireless communication system includes a reception module configured to receive a radio signal; a transmission module configured to transmit a radio signal; and a processor configured to generate a first reference signal based upon first configuration information for transmitting the first reference signal respective to a first frequency band, the first frequency band being received from a base station through the reception module, and to generate a second reference signal based upon second configuration information for transmitting the second reference signal respective to a second frequency band, the second frequency band being added to the first frequency band. Herein, in case a transmission point of the first reference signal coincides with a transmission point of the second reference signal, the processor may transmit only one of the two reference signals in accordance with a predetermined dropping rule, and the processor may transmit at least one of the first reference signal and the second reference signal to the base station through the transmission module.

The technical objects that are to be achieved in the present invention will not be limited only to the technical objects described above. Accordingly, additional technical objects of the present application will be set forth in part in the description which follows and in part will become apparent to those having ordinary skill in the art upon examination of the following or may be learned from practice of the present application. More specifically, technical objects that are not mentioned herein may also be understood by anyone having ordinary skill in the art.

Effects of the Invention

According to the exemplary embodiments of the present invention, when a frequency resource is extended in a wireless communication system, channel information of an extended resource region may be efficiently acquired and transmitted via uplink.

Also, when a contention occurs between an uplink signal being transmitted through an extended resource region and an uplink signal being transmitted through the conventional (or initial) resource region, by configuring the wireless communication system so that only one of the two signals can be transmitted in accordance with a predetermined drop rule, signal interference may be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

FIG. 8 illustrates a system having a system band, which is configured of 16 RBs.

FIG. 9 illustrates an example of transmitting both WB CQI and SB CQI, when the user equipment is signaled with information indicating {Cycle Period '5', Offset '1'}.

BEST MODE FOR CARRYING OUT THE PRESENT INVENTION

Figure 1:
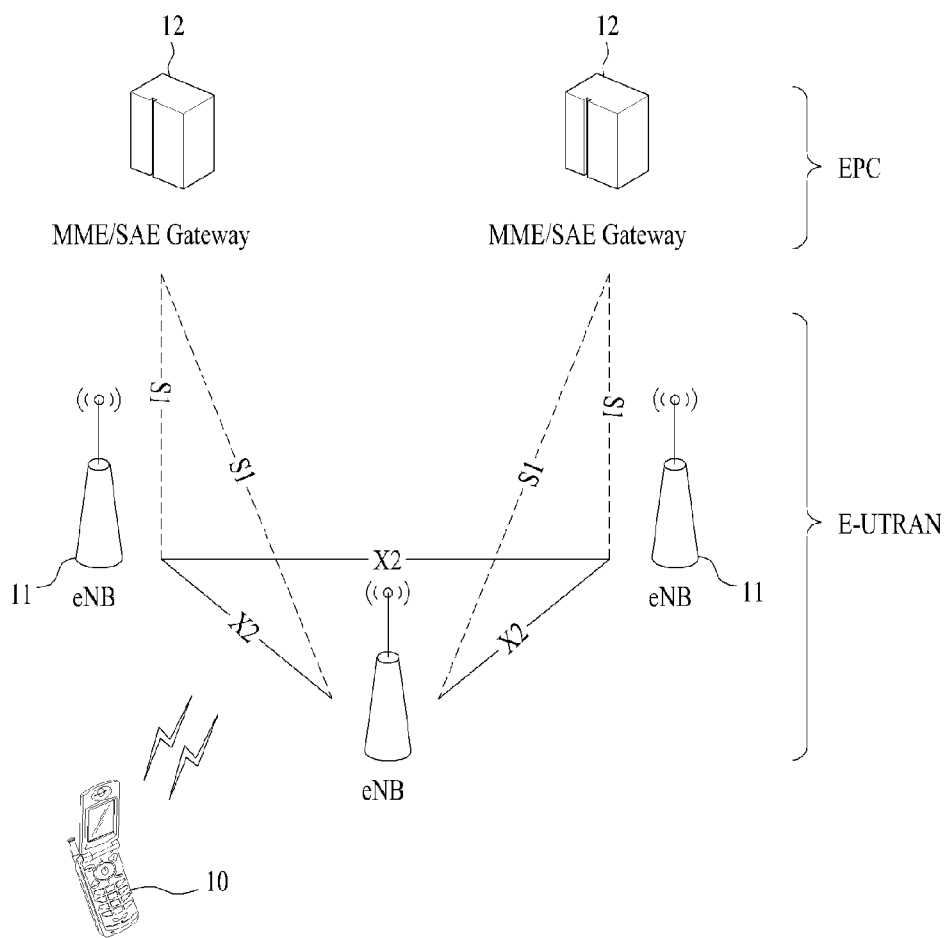
FIG. 1 illustrates an exemplary network structure of an E-UMTS.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP LTE system. However, with the exception for the unique features of the 3GPP LTE system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it is assumed that the user terminal (or user equipment) universally refers to a mobile or fixed user-end device, such as a User Equipment (UE), a Mobile Station (MS), an Advanced Mobile Station (AMS), and so on. Additionally, it is also assumed that the base station universally refers to as an arbitrary node of a network end, which communicates with the user equipment, such as a Node B, an eNode B, a Base Station, an AP (Access Point), and so on.

The following technology may be used in diverse wireless (or radio) access technologies, such as CDMA (code division multiple access), FDMA (frequency division multiple access), TDMA (time division multiple access), OFDMA (orthogonal frequency division multiple access), SC-FDMA (single carrier frequency division multiple access), and so on. More specifically, CDMA may be implemented in radio technologies, such as UTRA (Universal Terrestrial Radio Access) or CDMA2000. TDMA may be implemented in radio technologies, such as GSM (Global System for Mobile communications)/GPRS (General Packet Radio Service)/EDGE (Enhanced Data Rates for GSM Evolution). OFDMA may be implemented in wireless (or radio) technologies, such as IEEE 802.11 (Wi-Fi), IEEE 802.16 (WiMAX), IEEE 802.20, E-UTRA (Evolved UTRA), and so on. UTRA is part of UMTS (Universal Mobile Telecommunications System). 3GPP (3rd Generation Partnership Project) LTE (long term evolution) is part of E-UMTS (Evolved UMTS) using E-UTRA. LTE-A (Advanced) corresponds to an evolution of 3GPP LTE.

In order to clarify the description of the present invention, the description of the present invention is focused mainly on the 3GPP LTE/LTE-A system. However, this is merely exemplary. And, therefore, the present invention will not limit the technical spirit and scope of the present invention.

In a mobile communication system, a user equipment may receive information from a base station via Downlink, and the user equipment may also transmit information via Uplink. Examples of the information being transmitted or received by the user equipment may include data and diverse control information. And, depending upon the different purposes of the information being transmitted or received by the user equipment, a variety of physical channels may exist.

Figure 2:
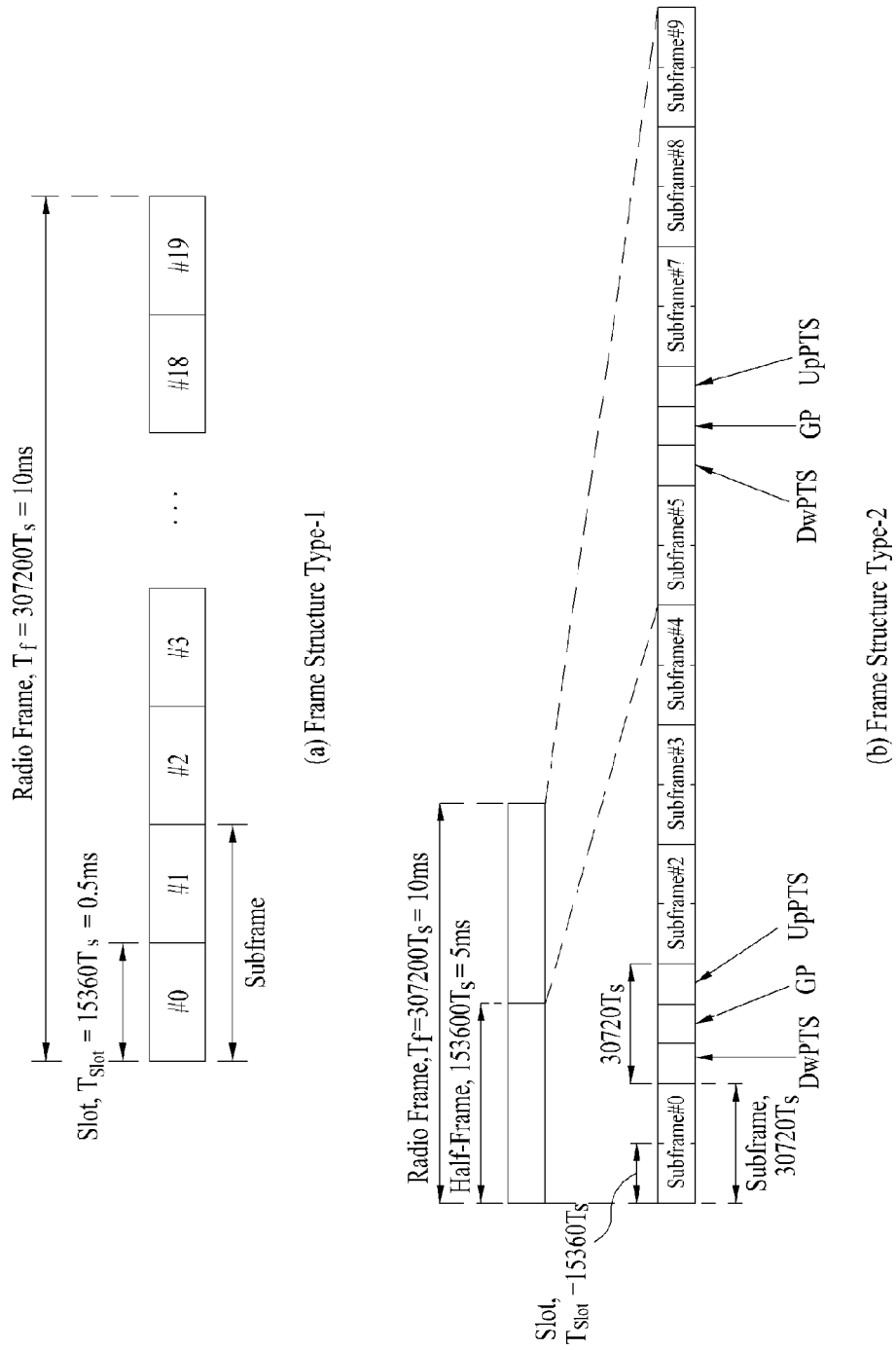
FIG. 2 illustrates an exemplary structure of a radio frame used in a 3GPP LTE.

FIG. 2 illustrates an exemplary structure of a radio frame used in an LTE.

Referring to FIG. 2, a radio frame has the length of 10 ms ($327200*T_s$) and includes ten (10) subframes each having the same size. Each subframe has the length of 1 ms and includes of two (2) 0.5 ms slots. Each slot has the length of 0.5 ms ($15360 \times T_s$). Herein, $T_S$ represents a sampling time and is indicated as $T_S=1/(15 \text{ kHz} \times 2048)=3.2552*0^{-8}$ (approximately 33 ns). A slot includes a plurality of OFDM (Orthogonal frequency Division Multiplexing) (or SC-FDMA) symbols in the time domain and includes a plurality of Resource Blocks (RBs) in the frequency domain. In the LTE system, one resource block includes 12 subcarriers*7(6) OFDM (or SC-FDMA) symbols. Frame structure type-1 and -2 are respectively used in FDD and TDD. The frame structure type-2 includes two (2) Half Frames, and each Half Frame includes five (5) subframes, a Downlink Piloting Time Slot (DwPTS), a Guard Period (GP), and an Uplink Piloting Time Slot (UpPTS). The above-described radio frame structure is merely exemplary. And, therefore, the number/length of the subframes, slots, or OFDM (or SC-FDMA) symbols may be diversely varied.

Figure 3:
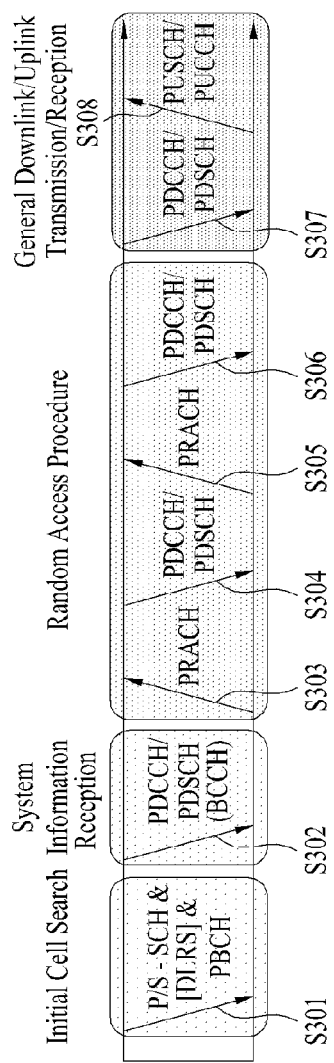
FIG. 3 illustrates a physical channel of a 3GPP LTE system and an exemplary signal transmission using the physical channel.

FIG. 3 illustrates physical channels that are used in the 3GPP system and a general method for transmitting signals using such physical channels.

Referring to FIG. 3, the user equipment performs initial cell search such as synchronization with the base station, when it newly enters a cell or when the power is turned on (S310). In order to do so, the user equipment synchronizes with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as verify the downlink channel status.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S320).

Meanwhile, if the user equipment initially accesses the base station, or if there are no radio resources for signal transmission, the user equipment may perform a Random Access Procedure (RACH) with respect to the base station (S330 to S360). In order to do so, the user equipment may transmit a specific sequence to a preamble through a Physical Random Access Channel (PRACH) (S330 and S350), and may receive a response message respective to the preamble through the PDCCH and the PDSCH corresponding to the PDCCH (S340 and S360). In case of a contention based RACH, a Contention Resolution Procedure may be additionally performed.

After performing the above-described process steps, the user equipment may perform PDCCH/PDSCH reception (S370) and Physical Uplink Shared Channel (PUSCH)/Physical Uplink Control Channel (PUCCH) transmission (S380), as general uplink/downlink signal transmission procedures. The control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 4:
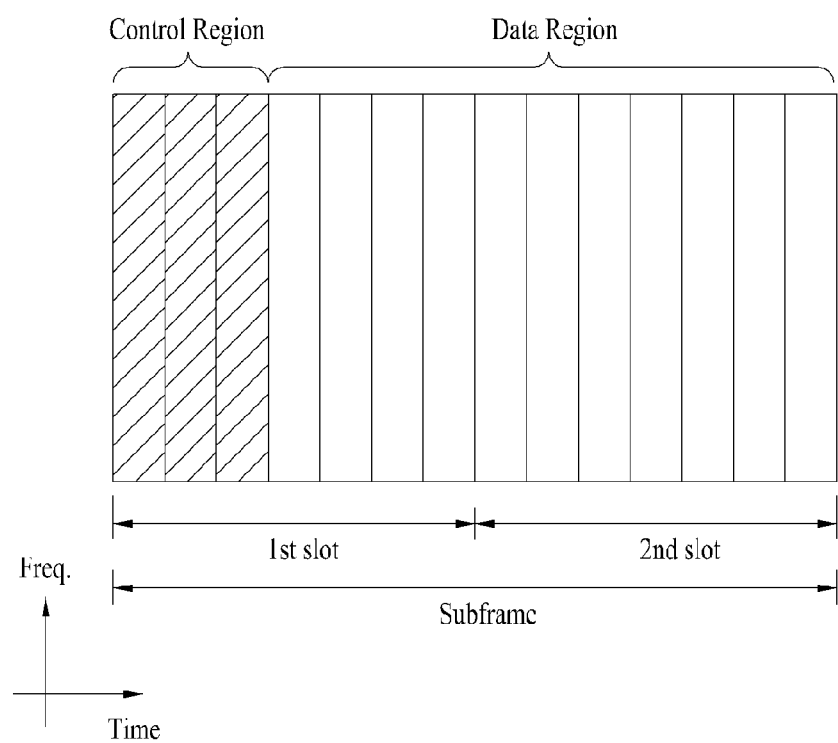
FIG. 4 illustrates an exemplary structure of a downlink subframe.

FIG. 4 illustrates an exemplary structure of a downlink subframe.

Referring to FIG. 4, one subframe includes two (2) slots in a time domain. A maximum of 3 OFDM symbols located at the beginning of a first slot correspond to a control region to which control channels are allocated. The remaining OFDM symbols correspond to a data region to which a Physical Downlink Shared Channel (PDSCH) is allocated.

Examples of a downlink control channel used by a 3GPP LTE may include a PCFICH (Physical Control Format Indicator Channel), a PDCCH (Physical Downlink Control Channel), a PHICH (Physical Hybrid ARQ Indicator Channel), and so on. The PCFICH, which is transmitted from the first OFDM symbol of the corresponding subframe, carries information related to the number of OFDM symbols (i.e., the size of the control region) used for the transmission of the control channels within the subframe. The control information being transmitted through the PDCCH may also be referred to as downlink control information (DCI). The DCI refers to uplink resource allocation information, downlink resource allocation information, uplink transmission power control commands respective to random user equipment groups, and so on. The PHICH carries an ACK (Acknowledgement)/NACK (Not-Acknowledgement) signal respective to an uplink HARQ (Hybrid Automatic Repeat Request). More specifically, the ACK/NACK signal respective to the uplink data transmitted by the user equipment is transmitted over (or through) the PHICH.

Hereinafter, the PDCCH, which is a downlink physical channel, will now be described in detail.

The PDCCH may carry resource allocation and transmission format (also referred to as a downlink grant) of the PDSCH, resource allocation information (also referred to as an uplink grant) of the PUSCH, a group of transmission power control commands respective to each individual user equipment within a random user equipment group, activation of VoIP (Voice over Internet Protocol), and so on. Multiple PDCCHs may be transmitted with the control region, and the user equipment may monitor the multiple PDCCHs. The PDCCH is configured of one or an aggregation of several consecutive control channel elements (CCEs). The PDCCH, which is configured of one or an aggregation of several consecutive control channel elements (CCEs) may be processed with subblock interleaving and then be transmitted through the control region. The CCE refers to a logical allocation unit, which is used for providing the PDCCH with a coding rate respective to a wireless channel condition (or status). The CCE corresponds to multiple resource element groups. Depending upon a correlation between the number of CCEs and the coding rate being provided by the CCEs, the PDCCH format and the number of available PDCCH bits may be decided.

The control information that is being transmitted through the PDCCH is referred to as a downlink control information (DCI). Table 1 below shows the DCI with respect to the corresponding DCI format.

TABLE 1

| DCI Format | Description |
|---|---|
| DCI format 0 | used for the scheduling of PUSCH |
| DCI format I | used for the scheduling of one PDSCH codeword |
| DCI format IA | used for the compact scheduling of one PDSCH codeword and random access procedure initiated by a PDCCH order |
| DCI format IB | used for the compact scheduling of one PDSCH codeword with precoding information |
| DCI format IC | used for very compact scheduling of one PDSCH codeword |
| DCI format ID | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates uplink resource allocation information, and DCI format 1~2 indicate downlink resource allocation information, and DCI format 3, 3A indicate an uplink TPC (transmit power control) command for random user equipment groups.

Figure 5:
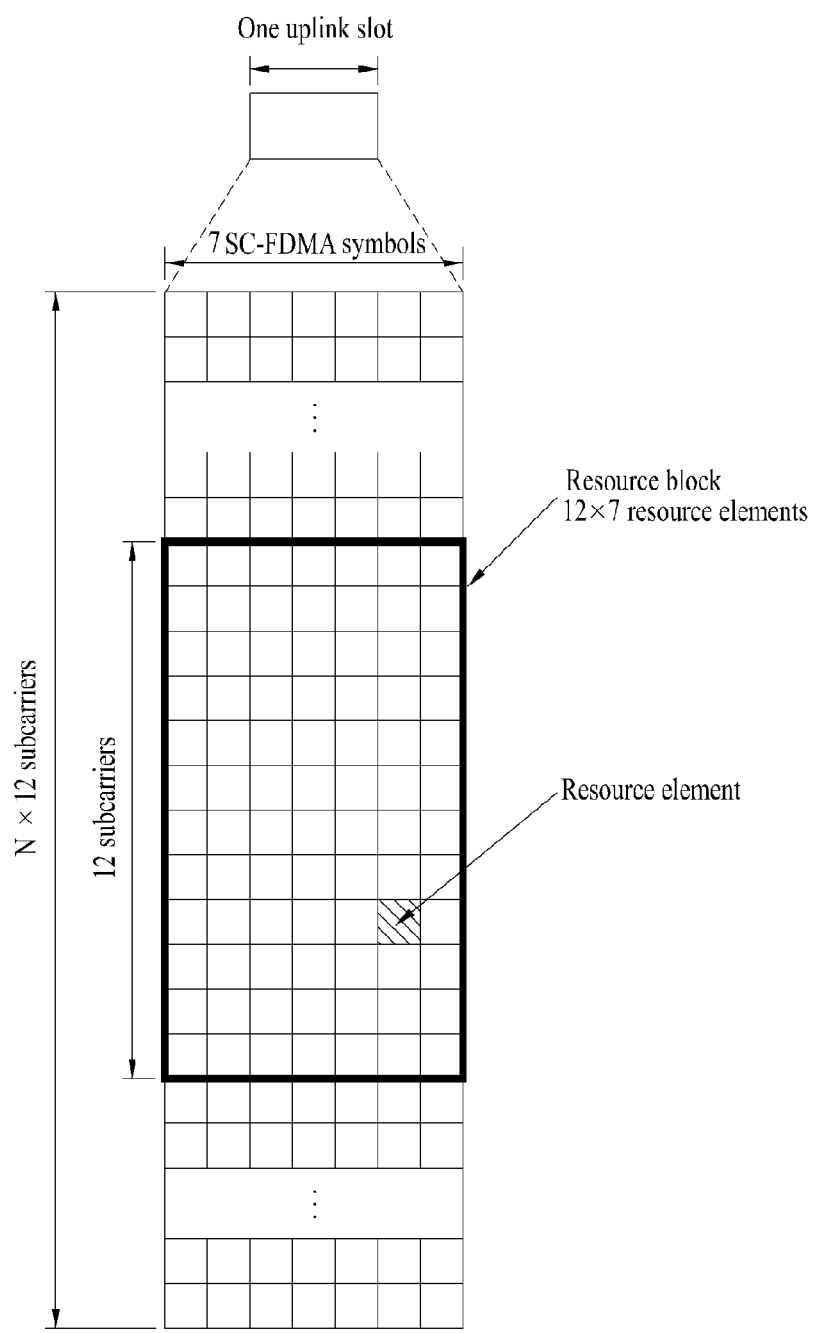
FIG. 5 illustrates a downlink time-frequency resource grid structure used in the 3GPP LTE system.

FIG. 5 illustrates a downlink time-frequency resource grid structure used in the 3GPP LTE system.

Referring to FIG. 5, a downlink signal being transmitted from each slot may be illustrated as a resource grid, as shown in FIG. 5, which is configured of $N_{RB}*N_{SC}$ number of subcarriers and $N_{symb}$ number of OFDM symbols or SC-FDMA symbols. Herein, $N_{RB}$ represents a number of Resource Blocks (RBs), $N_{SC}$ represents a number of subcarriers configuring an RB, and $N_{symb}$ represents a number of OFDM symbols or SC-FDMA symbols included in a slot. The size of the $N_{RB}$ may vary in accordance with a bandwidth configured within a cell, and the size of the $N_{RB}$ should also satisfy the condition of $N^{min}_{,RB} \leq N_{RB} \leq N^{max}_{,RB}$. Herein, $N^{min}_{,RB}$ signifies the smallest bandwidth that can be supported by the wireless communication system, and $N^{max}_{,RB}$ signifies the largest bandwidth that can be supported by the wireless communication system. For example, $N^{min}_{,RB}=6$, and $N^{max}_{,RB}=110$. However, the present invention will not be limited only to the example given herein. The number of OFDM symbols or SC-FDMA symbols included in a slot may vary depending upon the length of a Cyclic Prefix (CP) and an interval between subcarriers. In case of performing multiple antenna transmission, one resource grid may be defined for one antenna port.

Each element within a resource grid respective to each antenna is referred to as a Resource Element (RE), and each element is uniquely identified by an index pair (k,l) within the respective slot. Herein, as an index of the frequency domain, k has a value of any one of 0, ..., $N_{RB}*N_{SC}-1$, and, as an index of the time domain, l has a value of any one of 0, ..., $N_{symb}-1$.

Figure 6:
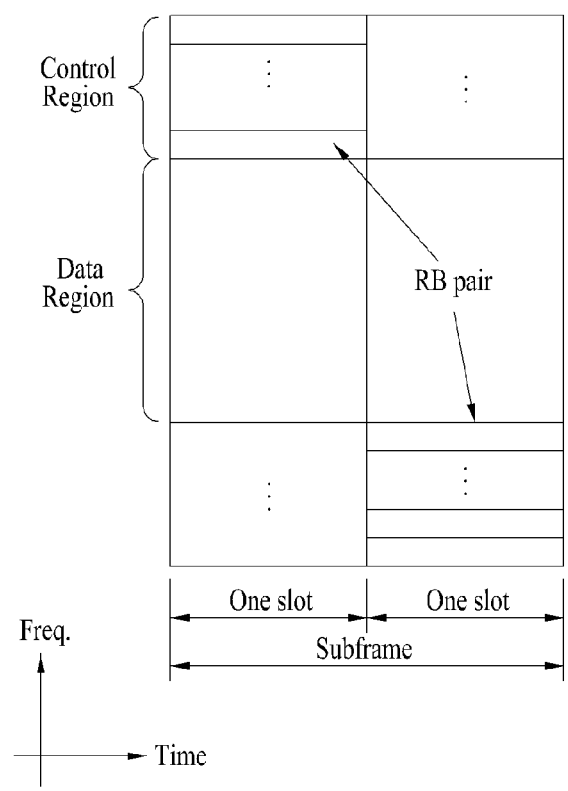
FIG. 6 illustrates an exemplary structure of an uplink subframe.

FIG. 6 illustrates an exemplary structure of an uplink subframe.

Referring to FIG. 6, an uplink subframe includes multiple slots (e.g., two (2) slots). The uplink subframe is divided into a data region and a control region within the frequency domain. The data region includes an uplink shared channel (PUSCH) and is used for transmitting data signals, such as voice, video, and so on. The control region includes an uplink control channel (PUCCH) and is used for transmitting control information. The PUCCH includes an RB pair located at each end portion of the data region in a frequency axis and hops at a slot boundary. The control information includes Hybrid Automatic Retransmit request (HARQ) ACK/NACK and channel information on the downlink (hereinafter referred to as downlink channel information or channel information). And, the downlink channel information includes CQI, PMI, RI, and so on. The base station may use the downlink channel information received from each user equipment to decide adequate time/frequency resources, modulation method, coding rate, and so on, in order to transmit data to each user equipment.

In the LTE system, channel information includes CQI, PMI, RI, and so on. And, depending upon the transmission mode of each user equipment, all of the CQI, PMI, RI, and so on, or only a portion of the CQI, PMI, RI, and so on may be transmitted. A case when the channel information is transmitted periodically is referred to as periodic reporting, and a case when the channel information is transmitted only upon request made by the base station is referred to as aperiodic reporting. In case of the aperiodic reporting, a request bit included in the uplink scheduling information delivered from the base station is transmitted to the user equipment. Thereafter, the user equipment delivers channel information, which is based upon its own transmission mode, to the base station through an uplink data channel (PUSCH). In case of the periodic reporting, a cycle period and an offset during the corresponding cycle period are signaled in subframe units through a higher layer signal for each user equipment by using a semi-static method. Each user equipment delivers channel information, which is based upon its own transmission mode, to the base station through an uplink control channel (PUCCH) in accordance with a decided cycle period. When uplink data also exists in the subframe, which transmits the channel information, the channel information is transmitted through the uplink data channel (PUSCH) along with the co-existing data. Based upon the channel status of each user equipment and based upon the user equipment distribution status within a cell, the base station may transmit transmission timing information, which is adequate for each user equipment, to the user equipments. The transmission timing information includes a cycle period for transmitting channel information, offset, and so on. And, the transmission timing information may be transmitted to each user equipment through a Radio Resource Control (RRC) message.

Figure 7:
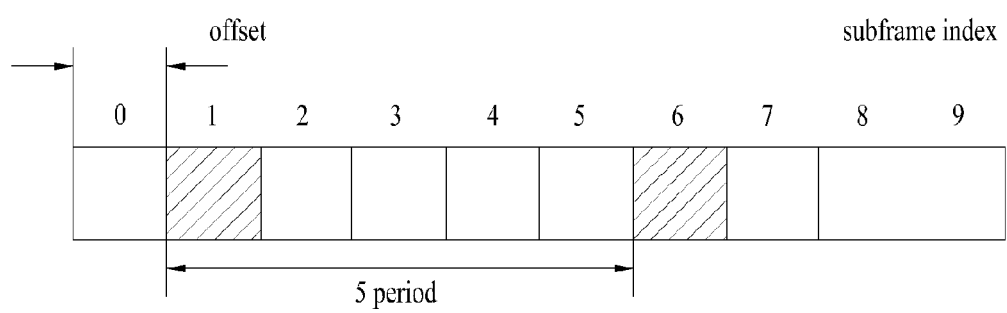
FIG. 7 illustrates an example of transmitting channel information, when the user equipment is signaled with information indicating {Cycle Period '5', Offset '1'}.

FIG. 7 to FIG. 9 respectively show examples of periodic reporting of channel information. The drawings are mainly focused on a case of transmitting downlink channel information (e.g., CQI, PMI, RI, and so on). However, although it is not shown in the drawing, the present invention may also be similarly applied to a case of transmitting uplink channel information (e.g., SRS, and so on).

FIG. 7 illustrates an example of transmitting-channel information, when the user equipment is signaled with information indicating {Cycle Period '5', Offset '1'}. Referring to FIG. 7, when information indicating that the cycle period is '5' and that the offset is '1' is received, the user equipment transmits channel information in units of 5 subframes with an offset of one subframe along an increasing direction of the subframe index starting from the $0^{th}$ subframe. The channel information is basically transmitted through PUCCH. However, if a PUSCH for transmitting data exists at the same time period, the channel information is transmitted through the PUSCH along with data. The subframe index is configured of a combination of a system frame information ($n_f$) and a slot index ($n_s$, 0~19). Since a subframe is configured of 2 slots, the subframe index may be defined as $10*n_f+floor(n_s/2)$. Herein, floor( ) indicates a floor function.

FIG. 8 illustrates a system having a system band, which is configured of 16 RBs. In this case, it will be assumed that the system band is configured of two Bandwidth Parts (BP) (BP0, BP1), that each BP is configured of two subbands (SB) (SB0, SB1), that each SB is configured of 4 RBs. This assumption is given as an example for describing the present invention. And, therefore, the number of BPs and the size of each SB may vary depending upon the size of the system band. Additionally, the number of SBs configuring each BP may vary depending upon the number of RBs, the number of BPs, and the SB size. When transmitting both WB (wideband) CQI and SB CQI, the WB CQI and the SB CQI are alternately transmitted. Meanwhile, when the PMI is also required to be transmitted in accordance with a PMI feedback type, the PMI information is transmitted along with the CQI information.

FIG. 9 illustrates an example of transmitting both WB CQI and SB CQI, when the user equipment is signaled with information indicating {Cycle Period '5', Offset '1'}.

Referring to FIG. 9, regardless of its type, the CQI may be transmitted only from a subframe corresponding to the signaled cycle period and offset. FIG. 9(a) illustrates an example wherein only the CQI is transmitted, and FIG. 9(b) illustrates an example wherein the CQI is transmitted along with a Rank Indicator (RI). The RI may be signaled from a higher layer (e.g., RRC layer) a combination of a particular multiple of the WB CQI transmission cycle period and the offset of the corresponding transmission cycle period. The offset of the RI is signaled as a value relative to the CQI offset. For example, when the offset of the CQI is '1', and when the offset of the RI is '0', the RI may have the same offset of the CQI. The value of the RI offset may be defined as 0 or a negative number. More specifically, it is assumed in FIG. 9(b) that, under the same environment as FIG. 9(a), the transmission cycle period of the RI is one time the transmission cycle period of the WB CQI, and it is also assumed that the RI offset is equal to '−1'. When the transmission subframe of the WB CQI overlays with the transmission subframe of the RI, the WB CQI is dropped and the RI is transmitted.

Meanwhile, in order to use a wider frequency bandwidth, the LTE-A system adopts a carrier aggregation (or bandwidth aggregation) technology gathering a plurality of up-/downlink frequency blocks, so as to use a larger (or wider) up-/downlink bandwidth. Each frequency block is transmitted by using a Component Carrier (CC). In the description of the present invention, depending upon the context, the component carrier may signify a frequency block for carrier aggregation or a central carrier of the frequency block, and such definitions may be alternately used herein.

Figure 10:
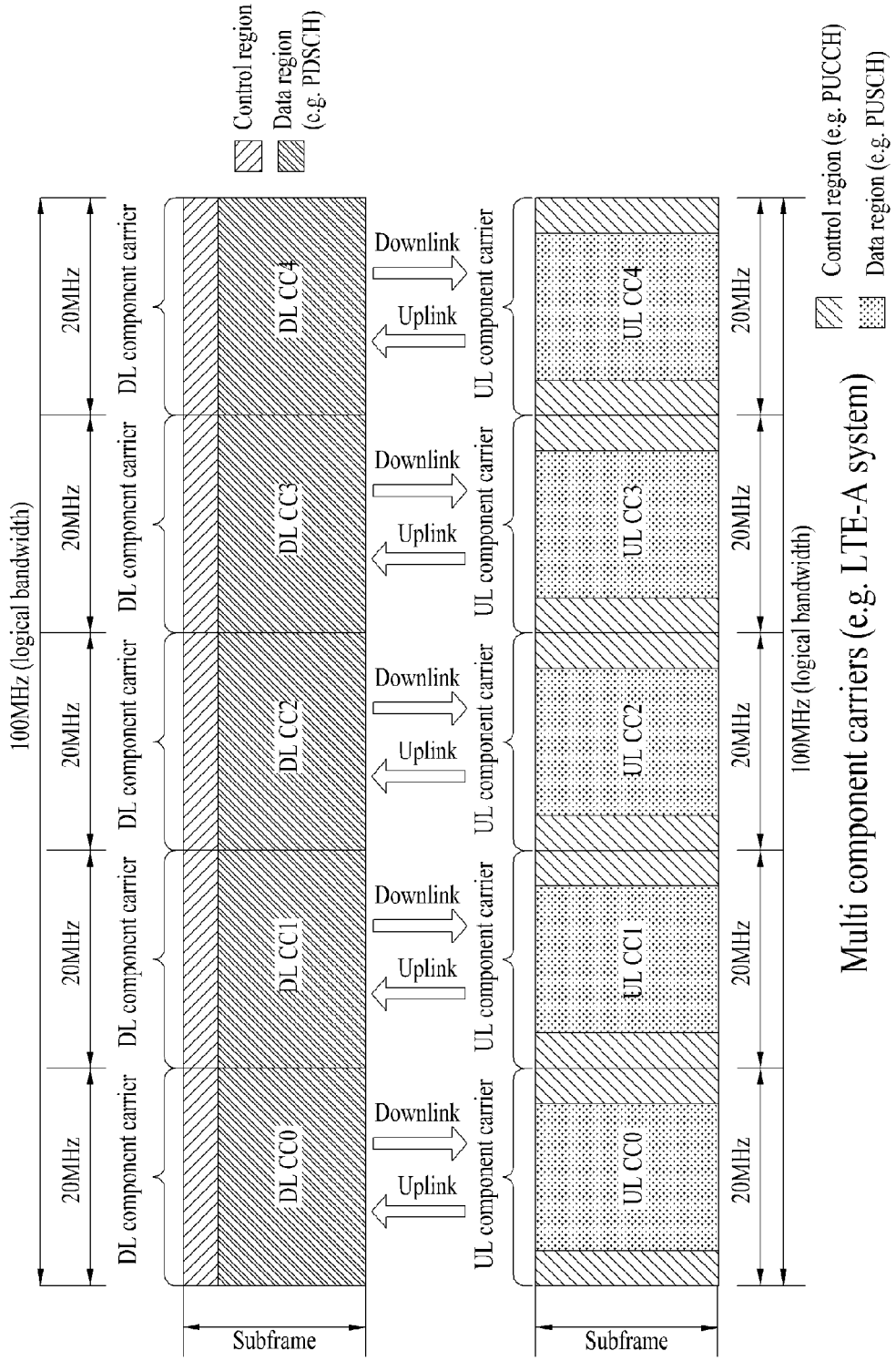
FIG. 10 illustrates an example of performing communication under a multiple component carrier situation, wherein the communication example may correspond to an exemplary communication performed in an LTE system.

FIG. 10 illustrates an example of performing communication under a multiple component carrier situation, which may correspond to the exemplary communication performing in an LTE-A system.

Referring to FIG. 10, 5 (five) 20 MHz CCs may be gathered in each of the up-/downlink, so as to support a 100 MHz bandwidth. The CCs may be adjacent or non-adjacent to one another in the frequency domain. FIG. 10 shows an example where the bandwidth of the uplink component carrier and the bandwidth of the downlink component carrier are identical to one another and are symmetrical to one another. However, the bandwidth of each component carrier may be decided independently. For example, the bandwidth of the downlink component carrier may be configured as 5 MHz (UL CC0)+20 MHz (UL CC1)+20 MHz (UL CC2)+20 MHz (UL CC3)+5 MHz (UL CC4).

Also, an asymmetrical carrier aggregation (or bandwidth aggregation), wherein the number of uplink component carriers and the number of downlink component carriers are different from one another, may be used. The asymmetrical carrier aggregation (or bandwidth aggregation) may be generated due to a limitation in the available frequency band, or may be artificially configured by network settings. For example, even if the overall, system band is configured of N number of CCs, the frequency band that can be received by one specific terminal may be limited to M(<N) number of CCs. Various parameters respective to the carrier aggregation may be determined by using a cell-specific method, a UE group-specific method, or a UE-specific method.

FIG. 10 shows an example wherein the uplink signal and the downlink signal are transmitted through a component carrier mapped at a one-to-one (1:1) correspondence with the signal. However, the component carrier through which a signal is actually being transmitted may vary depending upon the network settings or the signal type. For example, when a scheduling command is transmitted via downlink through the DL CC1, the data transmission and reception respective to the scheduling command may be performed through a different DL CC.

Additionally, the control information related to the DL CC may be transmitted via uplink through a specific UL CC (group) regardless of a mapping status. Downlink control information may also be similarly transmitted through a specific DL CC (group).

As described above, in order to increase the applicability of a multiple component carrier situation in an LTE-A system, and in order to support an efficient management of resources, various methods related to the frequency resource extension of an LTE bandwidth is currently being considered.

An example of the method for extending the frequency resource may include a method of supplementing (or adding) a segment to a legacy resource region as an extended resource region or a method of adding extra RBs or additional RBs. Herein, the legacy resource region is used to be differentiated from the extended resource region. And, an example of the legacy resource region may include an LTE bandwidth. A segment or RBs corresponding to the extended resource region may be considered as a bandwidth that may be used by the LTE-A user equipments.

(1) Segment

A segment refers to a resource region that is added in order to perform data extension of a carrier, which is used in an LTE/LTE-A system, in accordance with a backward compatible method. And, accordingly, the segment may be defined as a resource region that is non-backward compatibly used with respect to the LTE-A user equipments. For example, when 30 RBs are allocated as the frequency resource, 25 RBs may be aggregated as a backward compatible carrier, and the remaining 5 RBs may be designated as a segment region that can only be used by the LTE-A user equipments.

Figure 11:
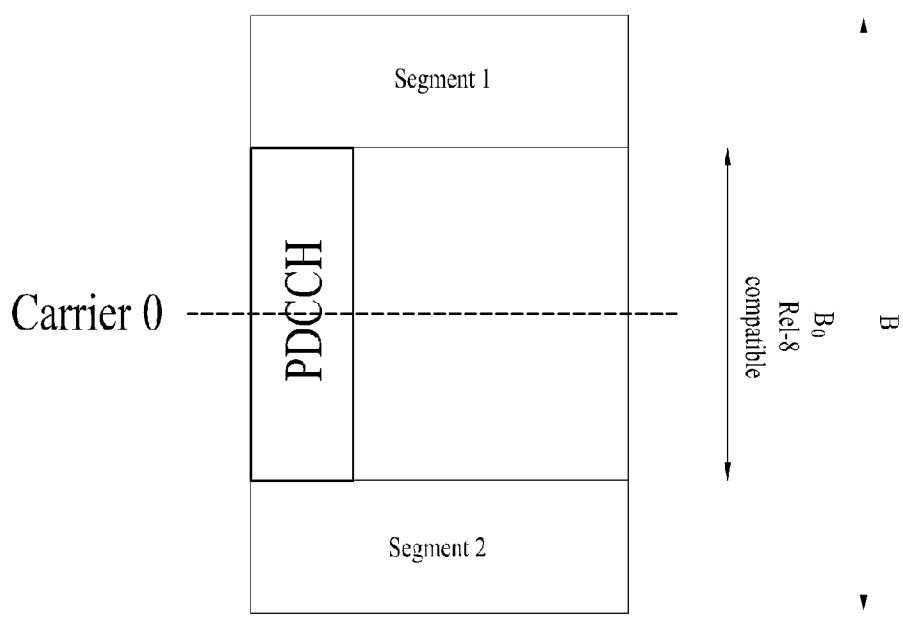
FIG. 11 illustrates an exemplary method for extending frequency resource related to the exemplary embodiment of the present invention, wherein a downlink subframe is given as an example.

FIG. 11 illustrates an exemplary method for extending frequency resource related to the exemplary embodiment of the present invention, wherein a downlink subframe is given as an example.

Referring to FIG. 11, in order to perform frequency resource extension, a segment that is only be used by the LTE-A user equipments may be additionally configured at each end of a downlink component carrier (CC), which may be compatibly used with respect to the convention LTE/LTE-A system.

For example, when the carrier bandwidth is B MHz, as a backward compatible region, $B_0$ MHz corresponding to a central portion of the bandwidth, the LTE user equipment may only recognize the $B_0$ MHz band (hereinafter referred to as an LTE band for simplicity). Therefore, control information and data may be transmitted in accordance with the LTE standard from the LTE band corresponding to the central region of the frequency bandwidth. In the overall carrier bandwidth, as a backward compatible region, the remaining regions (segment 1 and segment 2) excluding the LTE band may only be recognized by the LTE-A user equipments. More specifically, the LTE-A user equipment may use the overall carrier bandwidth B MHz. Each of the subbands being designated to a subframe may include an extended RB group, which is extended for the LTE-A user equipment.

When a user equipment newly enters a cell, or when the power of the user equipment is turned on, in order to allow the user equipment to perform initial cell search, such as performing synchronization with the base station, and in order to allow the user equipment to perform a random access procedure with respect to the base station, the base station transmits a synchronization signal, system information or paging information.

Additionally, as a resource region that is always being extended with respect to one carrier, a segment region is used for transmitting data information, which is transmitted only to an LTE-A user equipment, and a band region corresponds to the segment region corresponding to an extended carrier respective to a non stand-alone carrier. A stand-alone carrier corresponds to a carrier uniquely enabling the corresponding carrier to perform basic access, cell search, and system information transmission processes with respect to a user equipment within a random cell or base station or relay node based upon a definition of a physical channel and a physical signal each having the same format as an LTE Rel-8 carrier. Herein, the stand-alone carrier includes a backward compatible carrier and a non-backward compatible carrier. Therefore, the non stand-along carrier corresponds to a carrier that does not support the above-described procedure.

As shown in FIG. 11, when configuring multiple segments including two or more segments within a bandwidth corresponding to a CC, in the aspect of using system information and a guard band, a system overhead may be reduced.

(2) Adding Extra RBs During a Consecutive Carrier Aggregation Procedure

Generally, the usage rate of a channel bandwidth in an LTE system corresponds to 90%. For example, a transmission bandwidth that may be configured within a channel bandwidth of 20 MHz may be supported to up to 100 RB including the guard band. In the LTE-A system, when an LTE bandwidth is extended via carrier aggregation, as multiple carriers are being aggregated, the region occupied by the guard band of the LTE increases. Therefore, when performing consecutive carrier aggregation, the number of guard bands between each CC may be reduced or removed, and the corresponding region may be applied and used as a resource extension region for an LTE-A user equipment.

Figure 12:
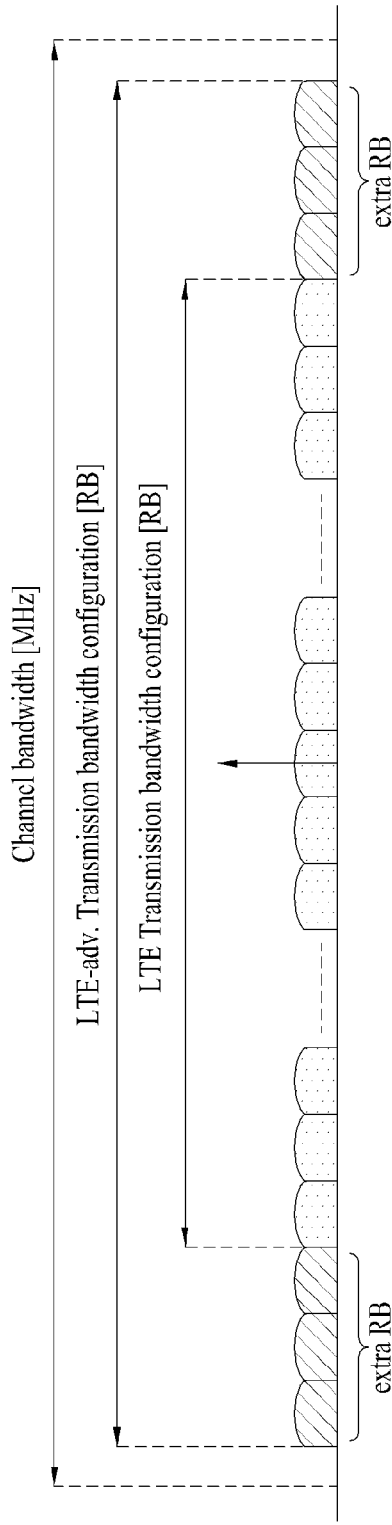
FIG. 12 illustrates an exemplary method for extending frequency resource related to the exemplary embodiment of the present invention, wherein the example shows extra RBs being added to a component carrier.

More specifically, as shown in FIG. 12, by newly defining a guard band included in a CC as an extra RB for performing signal transmission, a frequency resource may be extended. FIG. 12 illustrates an exemplary method for extending frequency resource related to the exemplary embodiment of the present invention, wherein the example shows extra RBs being added to a component carrier.

Referring to FIG. 12, by adding multiple extra RBs, which can only be used in the LTE-A, at both sides of the RBs configuring the LTE transmission bandwidth, in the channel bandwidth corresponding to one CC, an LTE-A transmission bandwidth more extended than the LTE transmission bandwidth may be configured.

The LTE user equipment may perform transmission and reception through a predetermined region of the CC, which corresponds to an RB allocated to the LTE transmission bandwidth. Meanwhile, by performing transmission and reception through an overall extended CC including LTE RBs and extra RBs, in case of performing consecutive carrier aggregation, the LTE-A user equipment may increase the efficiency in frequency usage.

For example, when it is assumed that the LTE transmission bandwidth is configured of 100 RBs, in an LTE-A transmission bandwidth, which is configured of 108 RBs, the remaining RBs excluding the 100 RBs correspond to extra RBs that are added for the LTE-A.

In the description of the present invention, with the exception for the RBs that are used in the conventional LTE within a channel bandwidth, RBs, which are used for data transmission with respect to an LTE-A user equipment, may be referred to as extra RBs, additional RBs, or non-compatible RBs. And, each term may be used to signify the same meaning.

As described above, as an exemplary method for supporting frequency resource extension in an LTE system bandwidth, such as segments or extra RBs, the present invention proposes a method for transmitting controlling information with respect to a downlink and a method for transmitting a reference signal in order to perform uplink channel measurement. Hereinafter, among the downlink channel information (e.g., CQI, PMI, RI, and so on), the CQI will be given as an example. And, a Sounding Reference Signal (SRS) for performing uplink measurement will also be given as an example for describing the present invention.

1. First Embodiment

Uplink CQI Report in Frequency Resource Extension

Generally, in an LTE system, channel information includes CQI, PMI (Precoding Matrix Indicator), RI (Rank Indicator), and so on. In case of a 3GPP LTE system, depending upon the transmission mode, each user equipment may transmit the control channel, such as CQI, PMI, RI, and so on, through a PUSCH or a PUCCH.

Herein, in relation to CQI reporting, the CQI reporting method used by the user equipment may be controlled by the base station. And, the CQI reporting method may be divided into periodic reporting, which transmits channel information periodically, and aperiodic reporting, which transmits channel information only upon request made by the base station.

(1) Aperiodic CQI Reporting

By configuring a CQI request bit from an uplink resource grant delivered from the base station through the PDCCH, the base station schedules the aperiodic CQI reporting method. Each user equipment uses the RRC signaling, which is transmitted from the base station, so as to configure the CQI reporting type.

The CQI reporting type existing in the LTE system may first of all be divided into a wideband (WB) CQI, which reports a single CQI value respective to the overall system bandwidth based upon the feedback type, and a subband (SB) CQI, which reports the CQI for each subband divided from the system bandwidth. Furthermore, the SB CQI may be divided into an eNB-configured subband feedback, which reports CQI by using a subband configured in the base station (eNB), and a UE-selected subband feedback, which report CQI through a subband selected by each user equipment.

According to the CQI reporting method respective to the eNB-configured subband feedback, the user equipment may not only report the WB CQI respective to the overall system bandwidth but may also report the CQI respective to each subband. The subband size (k) corresponds to a function of the system bandwidth, as shown in Table 3 below.

Table 2 shows a comparison between a system bandwidth and a subband size in the eNB-configured aperiodic reporting method.

TABLE 2

| System Bandwidth(RBs) | Subband size(k RBs) |
| --- | --- |
| 6-7 | Wideband CQI only |
| 8-10 | 4 |
| 11-26 | 4 |
| 27-63 | 6 |
| 64-110 | 8 |

According to the CQI reporting method respective to the UE-selected subband feedback, the user equipment may select a number (M) of preferred subbands for each subband size (k) within the overall system bandwidth. The user equipment reports one WB CQI and one CQI, which reflects an average quality of M number of selected subbands, to the base station.

Table 3 shows a subband size (k) respective to the system bandwidth and a number (M) of preferred subbands in the UE-selected aperiodic reporting method.

TABLE 3

| System Bandwidth(RBs) | Subband size(k RBs) | Number of preferred Subbands(M) |
| --- | --- | --- |
| 6-7 | Wideband CQI only | Wideband CQI only |
| 8-10 | 2 | 1 |
| 11-26 | 2 | 3 |
| 27-63 | 3 | 5 |
| 64-110 | 4 | 6 |

(2) Periodic CQI Reporting

In case of the periodic CQI reporting, a cycle period and an offset during the corresponding cycle period are signaled in subframe units through a higher layer signal for each user equipment by using a semi-static method. Each user equipment delivers a CQI, which is based upon its own transmission mode, to the base station through an uplink control channel (PUCCH) in accordance with a decided cycle period.

When uplink data also exists in the subframe, which transmits the channel information, the channel information is transmitted through the uplink data channel (PUSCH) along with the co-existing data. Based upon the channel status of each user equipment and based upon the user equipment distribution status within a cell, the base station may transmit transmission timing information, which is adequate for each user equipment, to the user equipments. The transmission timing information includes a cycle period for transmitting channel information, offset, and so on. And, the transmission timing information may be transmitted to each user equipment through a RRC message.

The CQI reporting type existing in the LTE system may first of all be divided into a wideband (WB) CQI, which reports a single CQI value respective to the overall system bandwidth based upon the feedback type, and a subband (SB) CQI, which reports the CQI for each subband divided from the system bandwidth. Furthermore, the SB CQI may be divided into an eNB-configured subband feedback, which reports CQI by using a subband configured in the base station (eNB), and a UE-selected subband feedback, which report CQI through a subband selected by each user equipment.

With respect to the periodic WB CQI reporting method, the reporting cycle period may be configured as {2, 5, 10, 16, 20, 32, 40, 64, 80, 160} ms or as 'OFF', in case of the FDD. The wideband feedback mode is similar to that, which is transmitted through the PUSCH, whereas the UE-selected subband CQI reporting is differentiated as a transmission method through the PUCCH. In this case, the overall number N of the subbands may be divided into J number of partial bandwidths, which are referred to as bandwidth parts (BW parts). As shown in Table 5 below, the value of J may vary in accordance with the system bandwidth. In case of the periodic UE-selected subband CQI reporting, a CQI value is calculated with respect to a specifically selected subband, which is selected from each BW part, along with a corresponding subframe index. Then, the calculated CQI value is reported.

TABLE 4

| System Bandwidth(RBs) | Subband size(k RBs) | Number of bandwidth parts(J) |
| --- | --- | --- |
| 6-7 | Wideband CQI only | 1 |
| 8-10 | 4 | 1 |
| 11-26 | 4 | 2 |
| 27-63 | 6 | 3 |
| 64-110 | 8 | 4 |

In case of transmitting such CQI via uplink through a resource region in accordance with a frequency resource extension, the subband CQI report is performed in resource units configured of multiple RBs. In this case, the present invention may propose a method wherein uplink signaling configuration information respective to the extended resource region uses configuration information related to the conventional resource region or a method of transmitting separate configuration information with respect to the extended resource region.

(3) CQI Transmission from a Frequency Resource Extension According to an Embodiment of the Present Invention In order to describe the method for transmitting control information, when extended frequency resource of a predetermined bandwidth is added to the legacy resource region, the LTE band will be given as an example of the legacy resource region, and extra RBs will be given as an example of the extended resource region.

Figure 13:
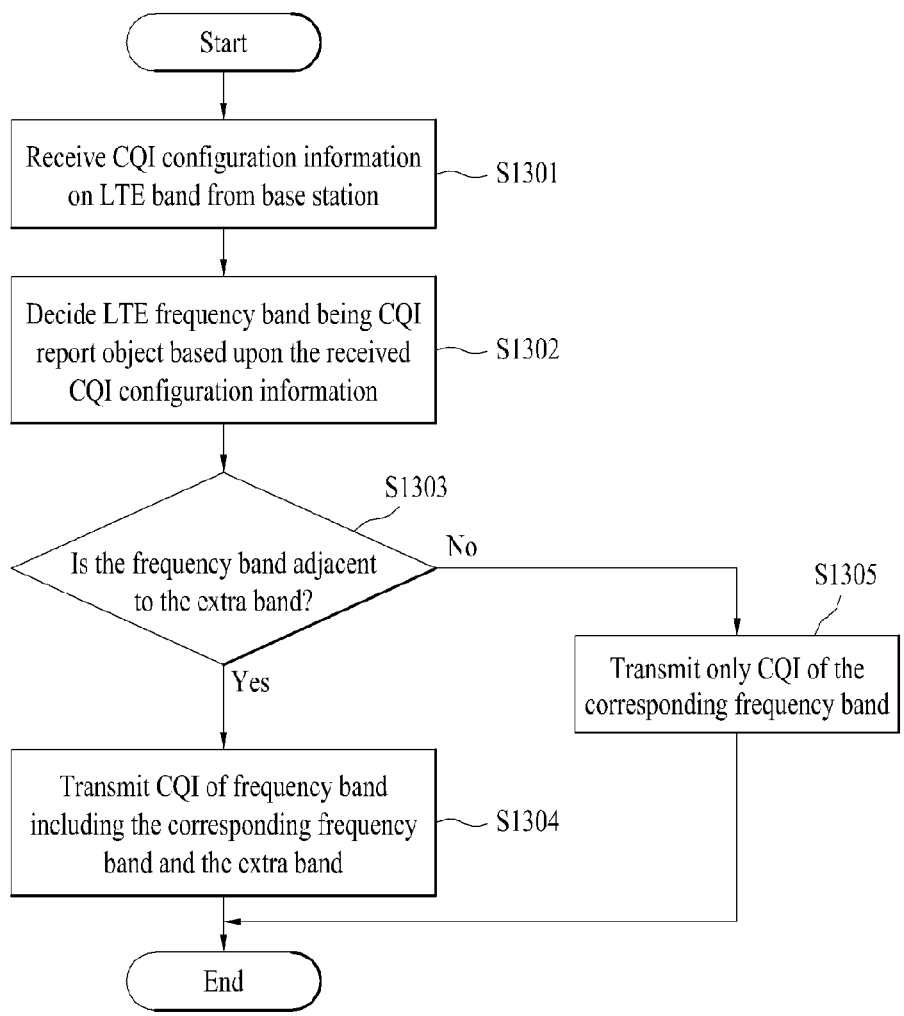
FIG. 13 illustrates a flow chart showing the process steps of an exemplary method for transmitting channel information via uplink according to an exemplary embodiment of the present invention.

FIG. 13 illustrates a flow chart showing the process steps of an exemplary method for transmitting channel information via uplink according to an exemplary embodiment of the present invention.

Referring to FIG. 13, the user equipment receives. CQI configuration information related to a system basic band or a legacy band (hereinafter referred to as an LTE band) from the base station (S1301). The CQI configuration information related to the LTE band is decided regardless of the extended frequency resource (hereinafter referred to as an extra band). Accordingly, when applying the SB CQI report type, the CQI configuration information may include at least any one of CQI report cycle period/offset, subband size, a number of bandwidth parts, and a number of preferred subbands.

The user equipment uses channel information acquired by performing channel measurement on an LTE band and also uses the CQI configuration information related to the LTE band, which is received during the previous process step, so as to decide the LTE frequency band being the CQI reporting target (S1302). CQI related to downlink channel quality may be acquired as the channel information, and the user equipment may use a UE-selected periodic CQI reporting method as the CQI reporting method.

More specifically, based upon the UE-selected periodic CQI reporting method, the LTE band may be divided into a predetermined number of BW parts (e.g., 4), and each BW part may include at least one or more subbands. The CQIs acquired in each subband are compared to one another for each BW part in order to identify the subframe indicating the most optimal CQI. Then, the optimal CQI is decided as the LTE frequency band, which is the CQI reporting target, and the respective channel information may be transmitted.

At this point, the user equipment determines whether or not the optimal CQI that is decided as the LTE frequency band being the CQI reporting target, in the previous process step S1302 is adjacent to an extra band (S1303). The extra band may correspond to a segment or an extra RB being added to the LTE frequency band, or the extra band may correspond to an extra RB being used as a band specifically used for signal transmission, among the guard bands of the LTE frequency band.

In case the LTE frequency band is adjacent to the extra band, the extra band is included in the corresponding LTE frequency band, and the corresponding CQI is transmitted to the base station (S1304). Herein, not only the CQI related to the LTE frequency band but also the CQI related to the extra band is included in the CQI being transmitted to the base station. If the LTE frequency band is not adjacent to the extra band, only the channel information respective to the corresponding LTE frequency band is transmitted to the base station (S1305).

As described above, according to the embodiment of the present invention, the user equipment may selectively (or optionally) transmit channel information on the extended resource region. And, when transmitting the channel information respective to the extended resource region, by including the corresponding channel information in an adjacent LTE frequency band and then transmitted the corresponding LTE frequency band, the number of subbands and the number of BW parts included in the overall LTE frequency band may also be maintained. Also, the channel information transmission method shown in FIG. 13 may also be applied to other types of downlink: channel information (e.g., PMI or RI).

Figure 14:
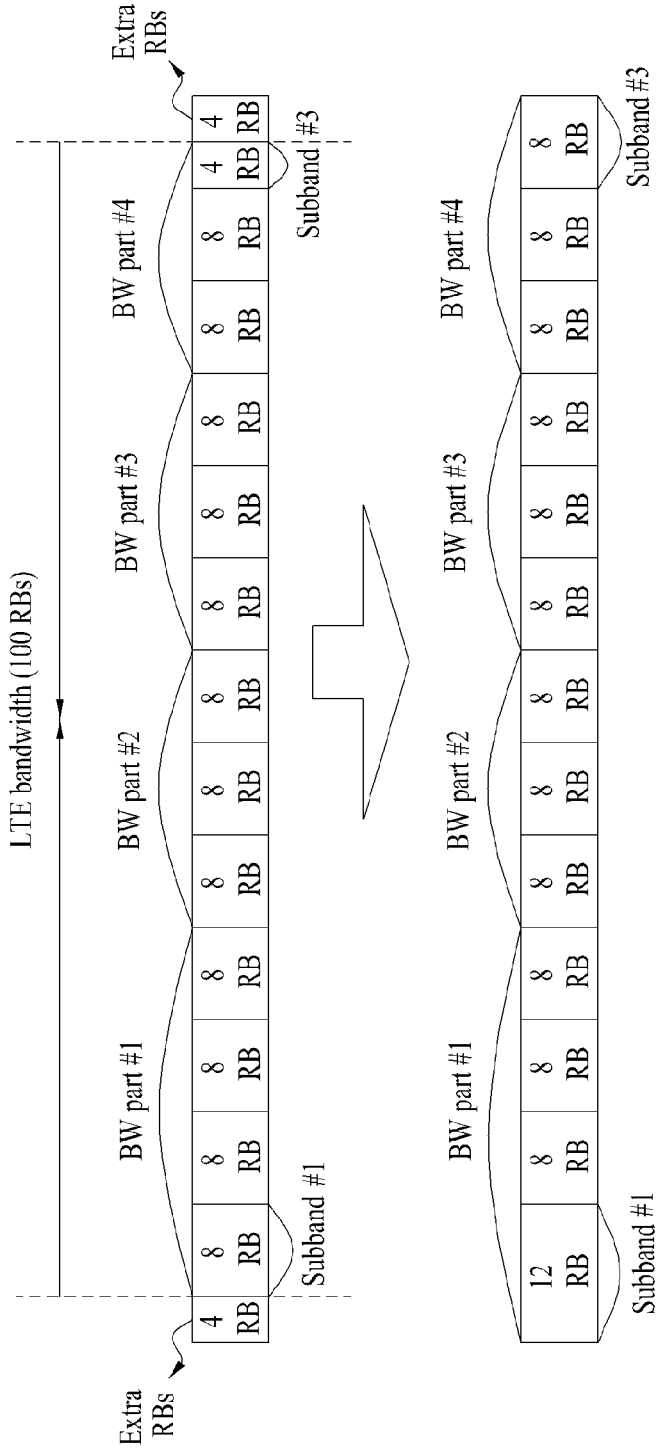
FIG. 14 illustrates an exemplary resource region, which is configured for reporting CQI, according to an exemplary embodiment of the present invention.

FIG. 14 illustrates an exemplary resource region, which is configured for reporting CQI, according to an exemplary embodiment of the present invention. More specifically, the example presented herein corresponds to a case when the UE-selected periodic CQI reporting method is used as the uplink CQI transmission method.

Referring to FIG. 14, it is assumed that the LTE bandwidth (or LTE band) is configured of 100 RBs and that a subband is configured in units of 8 RBs. At this point, any one of the subbands is configured of 4 RBs. Furthermore, it is also assumed that a total of 8 RBs is added to the extra RB, i.e., 4 RBs are added to each end of the LTE bandwidth, in order to extend the frequency resource.

The base station according to the embodiment of the present invention may generate configuration information on the 100 RBs solely based upon the LTE bandwidth, and, then, the base station may transmit the generated configuration information to the user equipment. At this point, the user equipment may apply the received configuration information related to the LTE bandwidth not only to the LTE bandwidth but also to the added extra RBs.

In order to do so, the LTE bandwidth is divided into a total of 4 BW parts including at least one or more subbands. And, in each BW part, a comparison process is performed on the CQI for each subband, so that a specific subband related to the CQI reporting can be decided.

As shown in FIG. 14, among the subbands of BW part #1, when the CQI of a subband (subband #1) adjacent to the extra RB is decided to be reported, or, among the subbands of BW part #4, when the CQI of a subband (subband #3) adjacent to the extra RB is decided to be reported, the base station may use the configuration information on the LTE bandwidth so as to configure an extended subband having a format of adding extra RBs adjacent to each subband. Accordingly, while the total number of subbands within the LTE bandwidth is maintained, the subbands (subband #1, subband #3) located at each end of the LTE bandwidth may be respectively extended from 8 RBs and 4 RBs to 12 RBs and 8 RBs.

At this point, while the user equipment transmits the CQI on the extended subband, the user equipment may also transmit index information of the extended subband (subband index=1 of BW part#1 or subband index=3 of BW part#4) through a predetermined number of allocated bits (e.g., 2 bits) along with the CQI on the extended subband.

Figure 15:
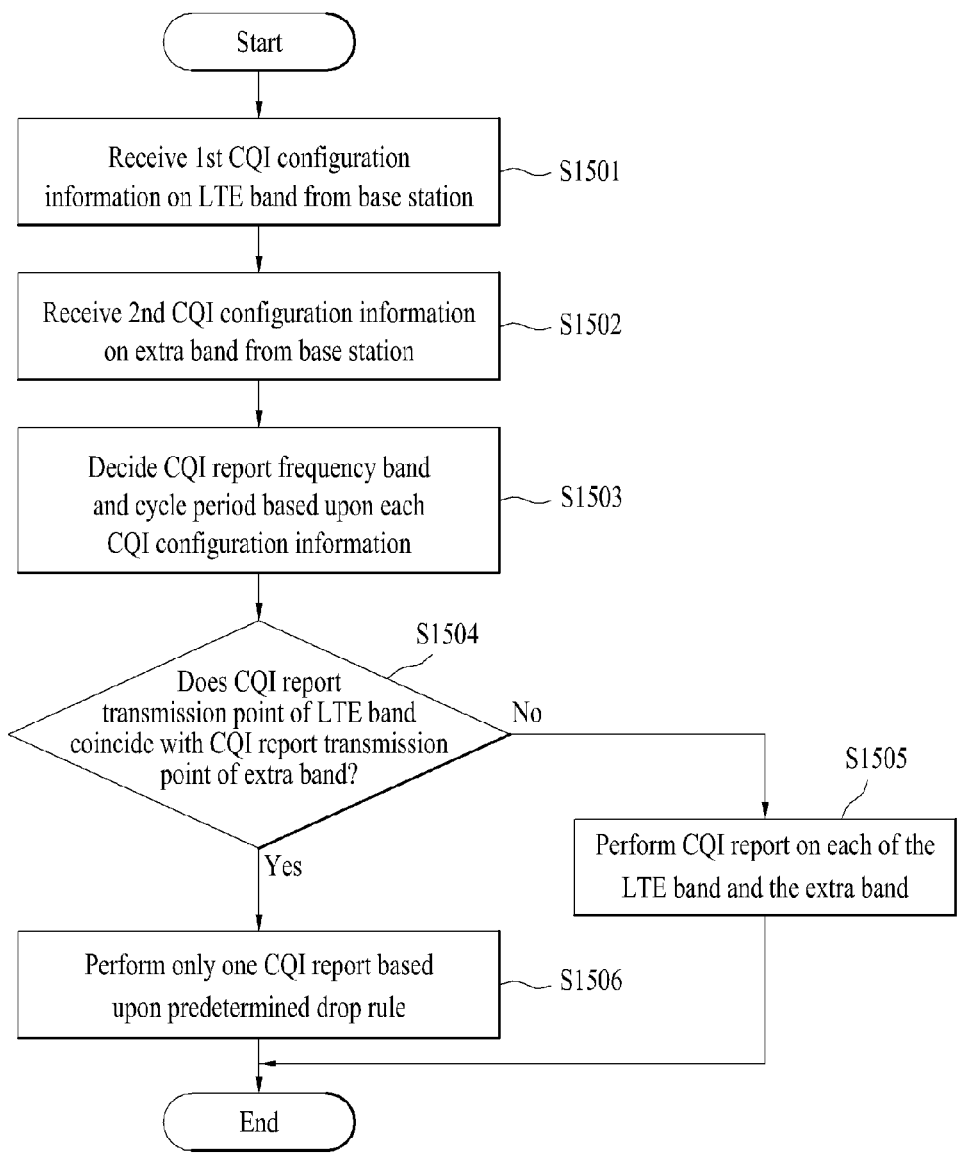
FIG. 15 illustrates a flow chart showing the process steps of an exemplary method for transmitting channel information via uplink according to another exemplary embodiment of the present invention.

Subsequently, FIG. 15 illustrates a flow chart showing the process steps of an exemplary method for transmitting channel information via uplink according to another exemplary embodiment of the present invention. Herein, the CQI is given as an example of the channel information.

According to the embodiment of the present invention, the base station may independently configure first configuration information enabling the user equipment to transmit downlink channel information on an LTE band, which is a legacy resource region, to the base station and second configuration information enabling the user equipment to transmit downlink channel information on an extended resource region to the base station.

More specifically, referring to FIG. 15, the user equipment may receive a first CQI configuration information on a system basic band (hereinafter referred to as an LTE band) and a second CQI configuration information on an extra band (or LTE-A band) via separate signaling (S1501 and S1502). At this point, the time order of the process step of the user equipment for receiving each configuration information may vary from the flow chart shown in FIG. 15. Also, the user equipment may receive the first CQI configuration information on the LTE band from the base station, and then the user equipment may use the received first CQI configuration information to deduce the second CQI configuration information on the extra band, or the user equipment may use offset information so as to indirectly acquire the second CQI configuration information on the extra band. Similarly, each configuration information may include at least any one of CQI report cycle period/offset, subband size, a number of bandwidth parts, and a number of preferred subbands.

The user equipment performs channel measurement on the LTE band and the extra band, and, then, the user equipment respectively applies the CQI configuration information received during the previous process step so as to decide the CQI reporting frequency band and cycle period (S1503). For example, in case of the UE-selected periodic CQI reporting method, the entire LTE frequency band is divided into a plurality of BW parts, and a specific LTE frequency band indicating an optimal CQI for each BW part. Conversely, the extra band is configured of extra RBs, and the user equipment configures a separate CQI respective to the extra band. Also, each of the CQI of the LTE frequency band and the CQI of the extra band is transmitted in accordance with the respective CQI transmission cycle periods, which are included in each of the first CQI configuration information and the second CQI configuration information, which are received during the previous process step. However, in this case, it is determined whether or not the transmission points of both CQIs coincide (or match) with one another (S1504).

If the transmission points of both CQIs do not match with one another, the CQI of the LTE frequency band and the CQI of the extra band are respectively transmitted in accordance with each CQI transmission cycle period included the first CQI configuration information and the second CQI configuration information, which are received during the previous process step (S1505).

If the CQI reporting time points for each frequency band match with one another, a signal interference may occur. In order to prevent such signal interference from occurring, when the CQI reporting time points of the LTE band and the extra band coincide with one another, configurations are made so that only one of the CQIs is transmitted in accordance with a predetermined drop rule (S1506).

The drop rule for the CQI reporting method is first configured by the base station, and the same rule may be applied to the user equipment or the base station when performing transmission to the user equipment or when setting up system configurations. An example of such dropping rule is shown in Table 5.

TABLE 5

| Dropping Rule | When the transmission point of $CQI_{LTE}$ coincides with the transmission point of $CQI_{ADD}$ |
|---|---|
| 1) | $CQI_{ADD}$ is always dropped. |
| 2) | A comparison is first made between bandwidths being the respective measurement objects of $CQI_{LTE}$ and $CQI_{ADD}$. Then, the CQI of the smallest bandwidth is dropped. |
| 3) | A comparison is made between transmission cycle periods of $CQI_{LTE}$ and $CQI_{ADD}$. Then, the CQI having the smallest transmission cycle period is dropped. |
| 4) | When the transmission cycle periods of $CQI_{LTE}$ and $CQI_{ADD}$ are identical to one another, any one of the two CQIs is alternately dropped at each transmission point. For example, when $CQI_{LTE}$ is dropped in the $1^{st}$ subframe, $CQI_{ADD}$ is dropped in the $2^{nd}$ subframe, and $CQI_{LTE}$ is dropped once again in the $3^{rd}$ subframe. This dropping method is repeatedly performed. |

In Table 5, $CQI_{LTE}$ corresponds to a CQI value respective to a channel measurement in an LTE Rel-8 band, which is a legacy resource region, and $CQI_{ADD}$ corresponds to a CQI value respective to a channel measurement in an extra band, which is an extended resource region.

In addition to the dropping rule presented in Table 5, the user equipment may compare the $CQI_{LTE}$ and the $CQI_{ADD}$, so as to transmit the CQI having the better characteristics. However, in this case, the user equipment may also transmit separate identification information indicating whether the CQI corresponds to the CQI of the LTE Rel-8 band or to the CQI of the extra band.

Similarly, the channel information transmission method shown FIG. 15 may also be applied to another downlink channel information (e.g., PMI or RI).

Figure 16:
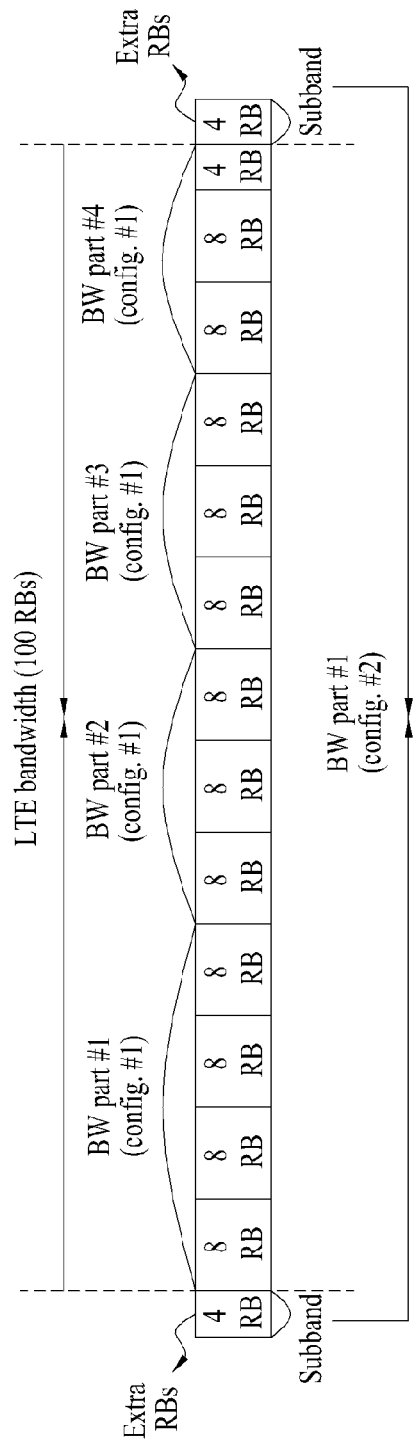
FIG. 16 illustrates another exemplary resource region, which is configured for reporting CQI, according to an exemplary embodiment of the present invention.

FIG. 16 illustrates another exemplary resource region, which is configured for reporting CQI, according to an exemplary embodiment of the present invention. More specifically, as a case of using the UE-selected periodic CQI reporting method, FIG. 16 shows an exemplary uplink CQI reporting method applying the CQI reporting method described in FIG. 15.

Similarly, as shown in FIG. 16, the LTE bandwidth is configured of 100 RBs, and a subband is configured in units of 8 RBs. And, the last 4 RBs configure a separate subband. 4 RBs may be added to each end of the LTE bandwidth, i.e., a total of 8 extra RBs may be added to the LTE bandwidth in order to extend the frequency resource.

Furthermore, as described in FIG. 15, by applying the configuration information of the LTE bandwidth and the configuration information of the extra RB received from the base station, the CQI respective to the subband of the LTE bandwidth and the CQI respective to the extra subband are separately transmitted via uplink. The extra subband is configured of extra RBs being added to each end of the LTE bandwidth.

At this point, when the CQI reporting time points of the CQI respective to the LTE bandwidth and the CQI respective to the extra band coincide with one another, only one of the CQIs may be transmitted by applying the dropping rule shown in Table 5.

2. Second Embodiment

SRS Transmission Method, when Frequency Resource is Extended

As another exemplary method for supporting frequency resource extension of an LTE system bandwidth, such as a segment or extra RB, the present invention proposes an uplink signaling method related to a Sounding Reference Signal (SRS) transmission.

Generally, in comparison with the conventional LTE system, the LTE-A system may use a greater number of antennae and a new network element, such as a relay. The LTE-A system including such new element should be capable of supporting a connection between the LTE-A system and an LTE-A user equipment. And, at the same, the LTE-A system should be capable of maintaining the performance of a legacy system, such as the convention LTE system.

Herein, the SRS may be given as an example of a signal that may be used by the base station for estimating a channel status from each user equipment to the base station.

In case of the LTE, the SRS is transmitted through a section including an SC-FDMA symbol, which is located at an end portion of the uplink subframe within a time axis, and a data transmission band within the frequency domain. Sounding reference signals respective to multiple user equipments that are being transmitted to the last SC-FDMA of the same uplink subframe may be differentiated from one another depending upon the frequency position/sequence. A cycle period for transmitting the SRS by using a semi-static method through a higher layer signal for each user equipment and an offset respective to the corresponding cycle period may be signaled in subframe units. Depending upon the system settings, the SRS may be transmitted through an entire band or subband. And, when the SRS is transmitted through a subband, frequency band hopping may be performed during the SRS transmission.

Channel information related to downlink or configuration information for transmitting the SRS (e.g., cycle period, offset, transmission band, hopping status, and so on) may be allocated from the base station to the user equipment via Cell-specific and/or UE-specific RRC signaling.

In order to support a larger number of SRS transmissions, a maximum of 4 SRS bandwidths may be simultaneously supported in the LTE in accordance with the system bandwidth. In order to provide mobility along with the value for an SRS bandwidth, 8 sets each configured of 4 SRS bandwidths may be defined with respect to each available system bandwidth. Among the 8 sets of SRS bandwidths, the base station may designate an SRS bandwidth, which the base station wishes to use, through a 3-bit cell-specific parameter (e.g., 'srsBandwidthConfiguration'), which is transmitted via RRC signaling. A maximum number SRS bandwidths may be diversely configured within a range that is not included in a PUCCH, which is located in the boundary region of the system bandwidth. An example of the 8 sets each configured of 4 SRS bandwidths is shown in Table 6.

Table 6 shows an example of an SRS bandwidth configuration respective to the system bandwidth.

TABLE 6

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Table 6, it is assumed that a system bandwidth is configured of a total of 80~110 RBs. As shown in Table 7, the vertical axis shows 8 SRS sets each configured of 4 SRS bandwidths. And, the horizontal axis indicates the number of RBs being allocated to the SRS transmission bandwidth for each index of the bandwidth being allocated for SRS transmission, and the horizontal axis also indicates a number of SRS bandwidths having the same size.

Referring to Table 6, it is apparent that the SRS bandwidth having the shortest length is configured of 4 RBs. The shortest SRS bandwidth being configured of 4 RBs is used for providing high quality channel information from a user equipment with limited power. In order to support frequency hopping of SRS bandwidths each having a different narrow band, the SRS bandwidth may be configured to have a tree structure, so that each SRS bandwidth can be multiplied by one another.

In relation to the above-described uplink SRS transmission, the present invention proposes a method of simultaneously transmitting SRS of a legacy resource region and SRS of an extended resource region via uplink SRS transmission in a frequency resource extension, or a method of independently transmitting each SRS with a predetermined time interval.

(1) Transmitting SRS of an Extended Resource Region Along with Conventional SRS

Figure 17:
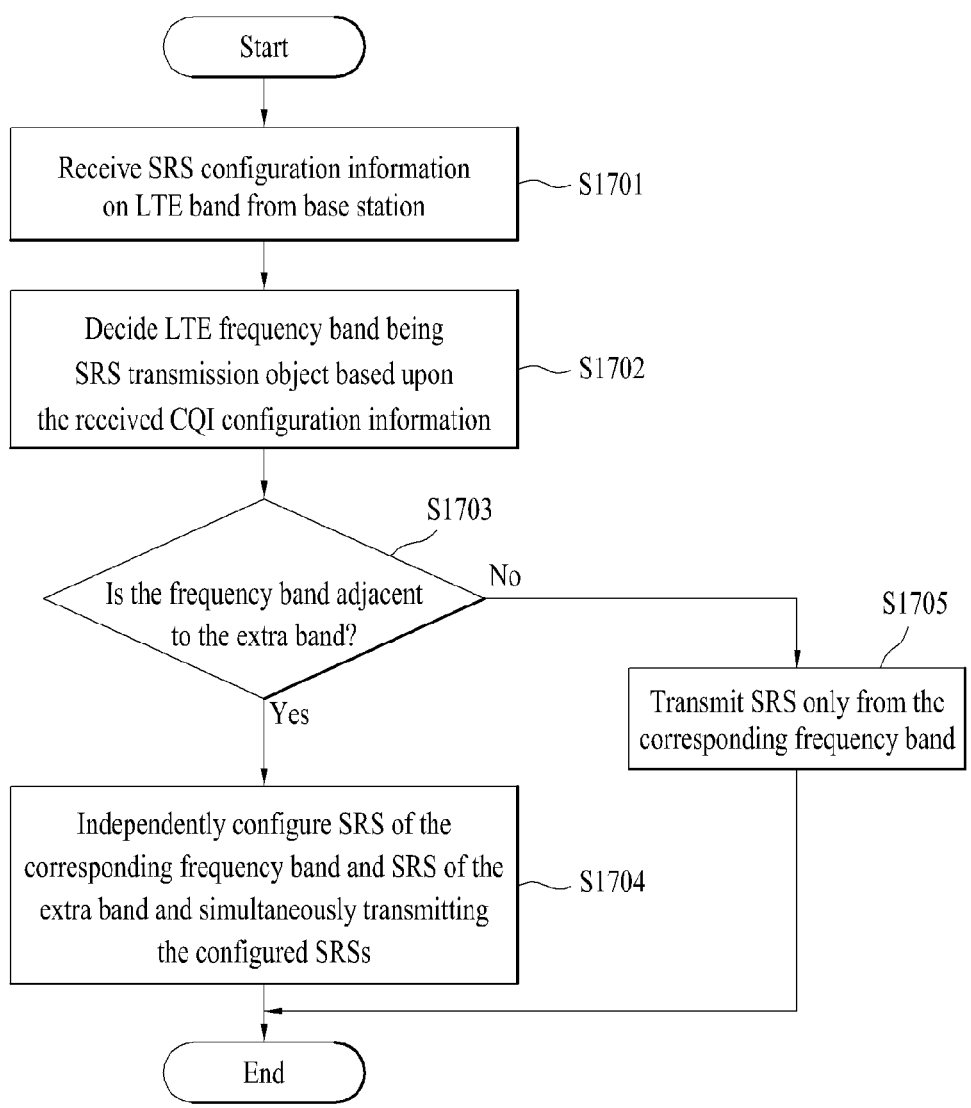
FIG. 17 illustrates an example of a signal for channel measurement being transmitted via uplink from a resource region, wherein the frequency resource is extended, according to an exemplary embodiment of the present invention.

FIG. 17 illustrates an example of a signal for channel measurement being transmitted via uplink from a resource region, wherein the frequency resource is extended, according to an exemplary embodiment of the present invention. Herein, a sounding reference signal (SRS) is given as an example of a signal for the channel measurement.

Referring to FIG. 17, the user equipment receives SRS configuration information of a system basic band (hereinafter referred to as an LTE band) from the base station (S1701). The SRS configuration information of the LTE band is decided regardless of the extended frequency resource (hereinafter referred to as an extra band). And, herein, the SRS configuration information may include at least any one of SRS transmission cycle period/offset, SRS BW configuration parameter, SRS BW, and SRS hopping BW.

The user equipment applies the SRS configuration information of the LTE band, so as to decide the LTE frequency band being the SRS transmission target (S1702).

At this point, the user equipment determines whether or not the decided LTE frequency band is adjacent to an extra band (S1703). The extra band refers to a band configured of extra RBs added to the LTE band. Herein, in case the decided LTE frequency band is adjacent to the extra band, the SRS of the corresponding LTE frequency band and the SRS of the extra band are independently configured and transmitted simultaneously (S1704). At this point, the SRS symbol of the extra RB is generated by being differentiated from the SRS symbol respective to the SRS bandwidth of the LTE band.

Conversely, if the LTE frequency band is not adjacent to the extra band, the SRS is transmitted only from the corresponding LTE frequency band (S1705).

Figure 18:
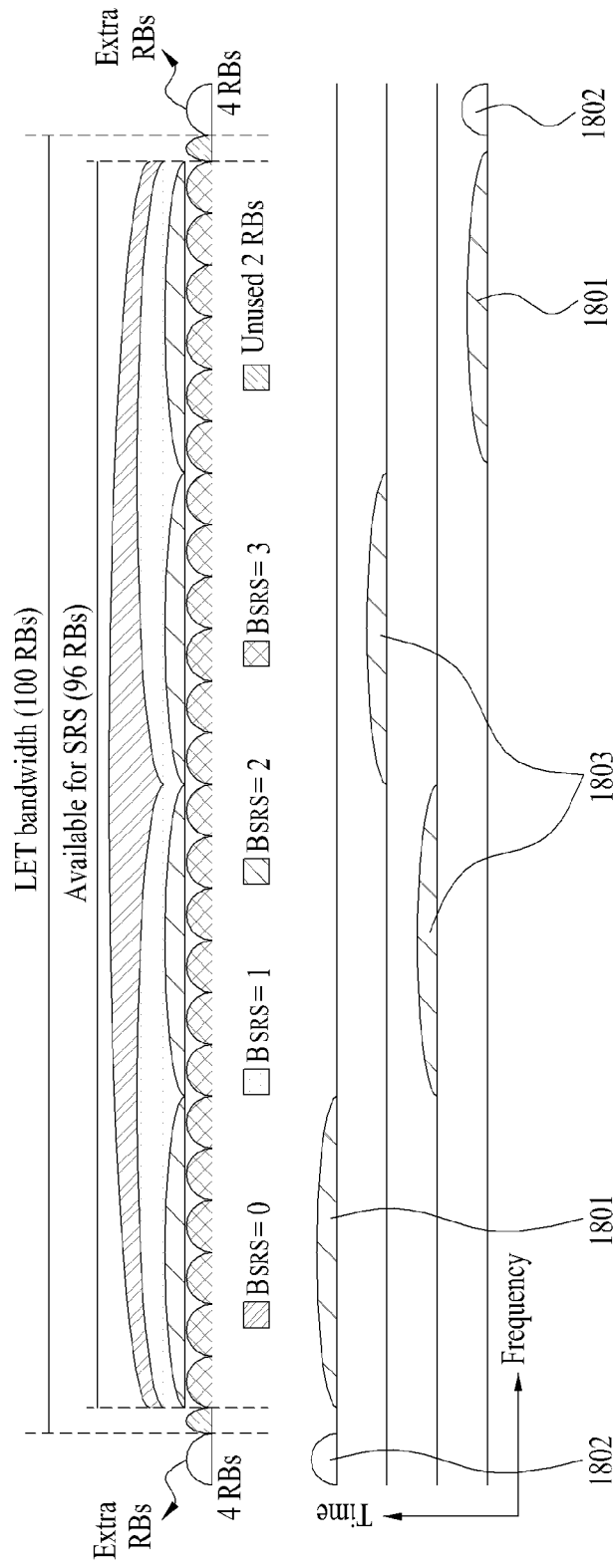
FIG. 18 illustrates an exemplary frequency bandwidth in which SRS transmission is performed from a resource region, wherein the frequency resource is extended, according to an exemplary embodiment of the present invention.

An example of the SRS transmission frequency band according to the above-described exemplary embodiment of the present invention is shown in FIG. 18.

FIG. 18 illustrates an exemplary frequency bandwidth in which SRS transmission is performed from a resource region, wherein the frequency resource is extended, according to an exemplary embodiment of the present invention.

More specifically, it is assumed that 100 RBs are allocated to the LTE bandwidth, which corresponds to the legacy resource region, and that 4 RBs are added to both ends of the LTE bandwidth. In the LTE bandwidth, 96 RBs are allocated in relation to SRS transmission hopping, and, within the entire system bandwidth, 4 RBs are not used for SRS transmission. In relation to SRS transmission bandwidth hopping, among the 8 exemplary SRS bandwidth sets shown in Table 6, when applying the SRS bandwidth set of index 0, 96 RBs are allocated to the SRS bandwidth ($B_{SRS}=0$) of index 0, 48 RBs are allocated to the SRS bandwidth ($B_{SRS}=1$) of index 1, so as to configure 2 SRS bandwidths, 24 RBs are allocated to the SRS bandwidth ($B_{SRS}=2$) of index 2, so as to configure 4 SRS bandwidths, and 4 RBs are allocated to the SRS bandwidth ($B_{SRS}=3$) of index 3, so as to configure a total of 24 SRS bandwidths.

The user equipment may apply the SRS configuration information of the LTE bandwidth, which is transmitted from the base station, to the 4 RBs extended at each end of the LTE bandwidth. At this point, as shown in FIG. 18, the SRS configuration information of the SRS transmission bandwidth, which is allocated with 24 RBs of index 2, may be applied to the extended 4 RBs. Among the SRS transmission bandwidths of the 24 RBs allocated to the LTE bandwidth, the user equipment may additionally transmit SRS of the extra 4 RBs (1802) at an SRS transmission point of the SRS transmission bandwidth (1801) most adjacent to the extra RBs. At this point, the SRS symbols respective to the extended 4 RBs (1802) may be configured to be separated from the SRS symbols respective to the SRS bandwidth (1801) of the 24 RBs. As for the SRS bandwidths (1803) that are not adjacent to the Extra RBs, only the SRSs respective to the corresponding bandwidths are transmitted.

(2) Transmitting SRS of the Extended Resource Region by Differentiating the SRS of the Extended Resource Region from the Conventional SRS According to the embodiment of the present invention, the base station differentiates the legacy resource region (e.g., LTE band) from the extended resource region (e.g., segment or extra RB), and, then, the base station transmits configuration information related to the uplink SRS transmission (e.g., SRS transmission cycle period/offset, SRS BW configuration parameter, SRS BW, and SRS hopping BW) of each resource region to each user equipment.

Thereafter, each user equipment generates a separate SRS, depending upon the SRS configuration information, which is allocated to the legacy resource region and the extended resource region, thereby transmitting the generated SRS to the base station via uplink.

Figure 19:
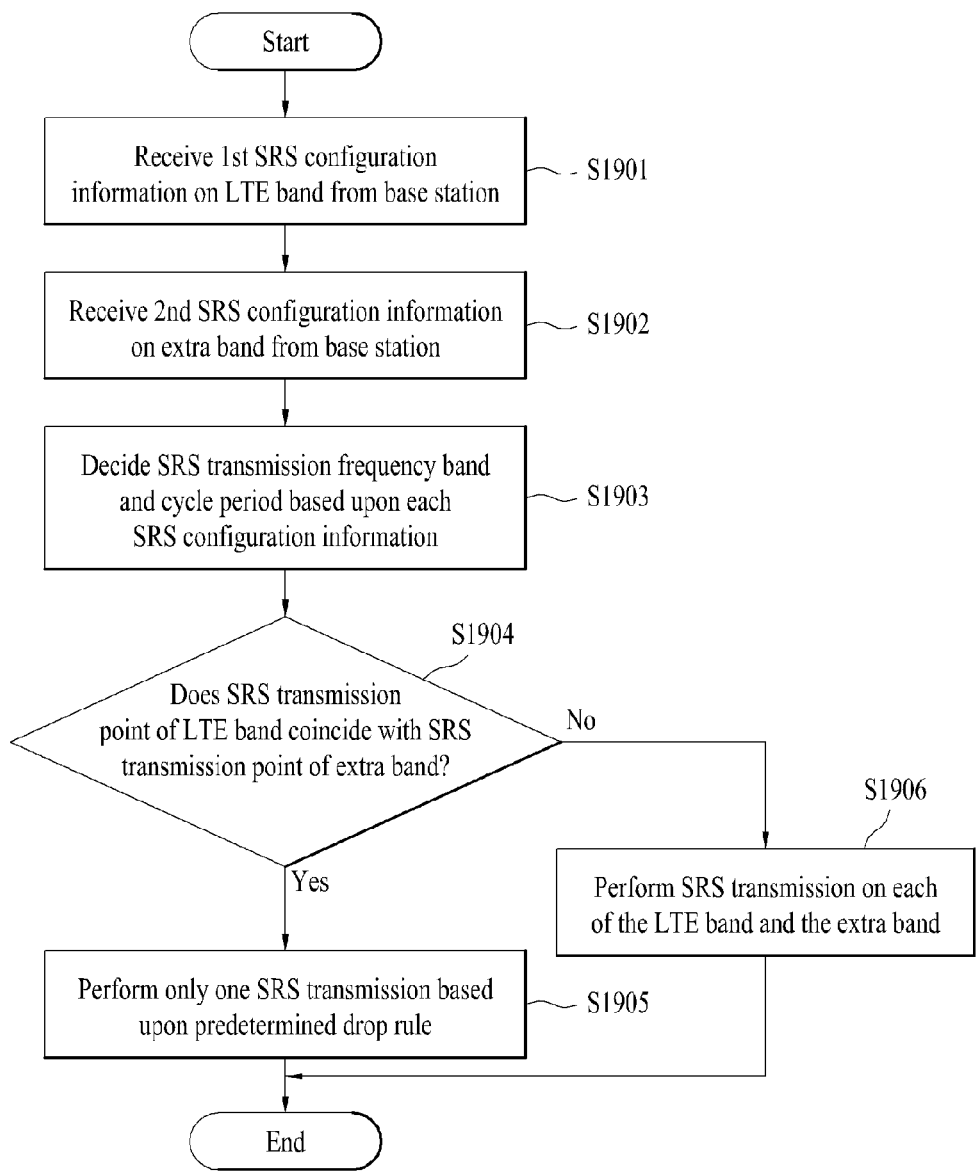
FIG. 19 illustrates another example of a signal for channel measurement being transmitted via uplink from a resource region, wherein the frequency resource is extended, according to an exemplary embodiment of the present invention.

FIG. 19 illustrates another example of a signal for channel measurement being transmitted via uplink from a resource region, wherein the frequency resource is extended, according to an exemplary embodiment of the present invention. Herein, a sounding reference signal (SRS) will be given as an example of the signal for performing channel measurement in order to describe the embodiment of the present invention.

Referring to FIG. 19, the user equipment receives first SRS configuration information related to the legacy resource region (hereinafter referred to as an LTE band) and second SRS configuration information related to the extended resource region (hereinafter referred to as an extra band) from the base station via separate signaling (S1901 and S1902).

Additionally, the user equipment decides a predetermined frequency band for transmitting the SRS from the entire LTE frequency band, based upon the first SRS configuration information, and, then the user equipment decides the respective transmission cycle period. Thereafter, the user equipment configures an SRS respective to the extra band based upon the second SRS configuration information in accordance with a predetermined transmission cycle period (S1903).

As described above, in case the base station separately configures configuration information related to SRS transmission respective to the LTE frequency band and the extra band, there may occur a case when the transmission points coincide, regardless of whether or not the SRS transmission cycle period are identical to one another. And, accordingly, interference may occur between SRS signals, which are transmitted at the same transmission point.

Therefore, the user equipment first determines whether or not the SRS transmission point of the LTE band coincides with the SRS transmission point of the extra band (S1904). Thereafter, in case the two SRS transmission points do not coincide, the SRSs respective to the LTE band and the extra band may be transmitted in accordance with the respective transmission cycle period (S1905).

Alternatively, in case the two SRS transmission points coincide, the system may be configured so that any one of the two SRSs can be transmitted in accordance with a predetermined dropping rule (S1906). Herein, the dropping rule related to the SRS transmission is first configured by the base station, and the same rule may be applied to the user equipment or the base station when performing transmission to the user equipment or when setting up system configurations. An example of such dropping rule is shown in Table 7.

TABLE 7

| Dropping Rule | When the transmission point of $SRS_{LTE}$ coincides with the transmission point of $SRS_{ADD}$ |
|---|---|
| 1) | $SRS_{ADD}$ is always dropped. |
| 2) | A comparison is first made between bandwidths being the respective measurement objects of $SRS_{LTE}$ and $SRS_{ADD}$. Then, the SRS of the smallest bandwidth is dropped. |
| 3) | A comparison is made between transmission cycle periods of $SRS_{LTE}$ and $SRS_{ADD}$. Then, the SRS |

TABLE 7-continued

| Dropping Rule | When the transmission point of $SRS_{LTE}$ coincides with the transmission point of $SRS_{ADD}$ |
|---|---|
| | having the smallest transmission cycle period is dropped. |
| 4) | When the transmission cycle periods of $SRS_{LTE}$ and $SRS_{ADD}$ are identical to one another, any one of the two SRSs is alternately dropped at each transmission point. For example, when $SRS_{LTE}$ is dropped in the $1^{st}$ subframe, $SRS_{ADD}$ is dropped in the $2^{nd}$ subframe, and $SRS_{LTE}$ is dropped once again in the $3^{rd}$ subframe. This dropping method is repeatedly performed. |

In Table 7, $SRS_{LTE}$ corresponds to an SRS transmission from an LTE Rel-8 band, which corresponds to an example of the legacy resource region, and $SRS_{ADD}$ corresponds to an SRS transmission from an extra band, which is configured of extra RBs.

In addition to the dropping rule presented in Table 7, the user equipment may compare the $SRS_{LTE}$ and the $SRS_{ADD}$, based upon the uplink channel status, so as to transmit the SRS having the better characteristics. However, in this case, the user equipment may also transmit separate identification information indicating whether the CQI corresponds to the CQI of the LTE Rel-8 band or to the CQI of the extra band.

Figure 20:
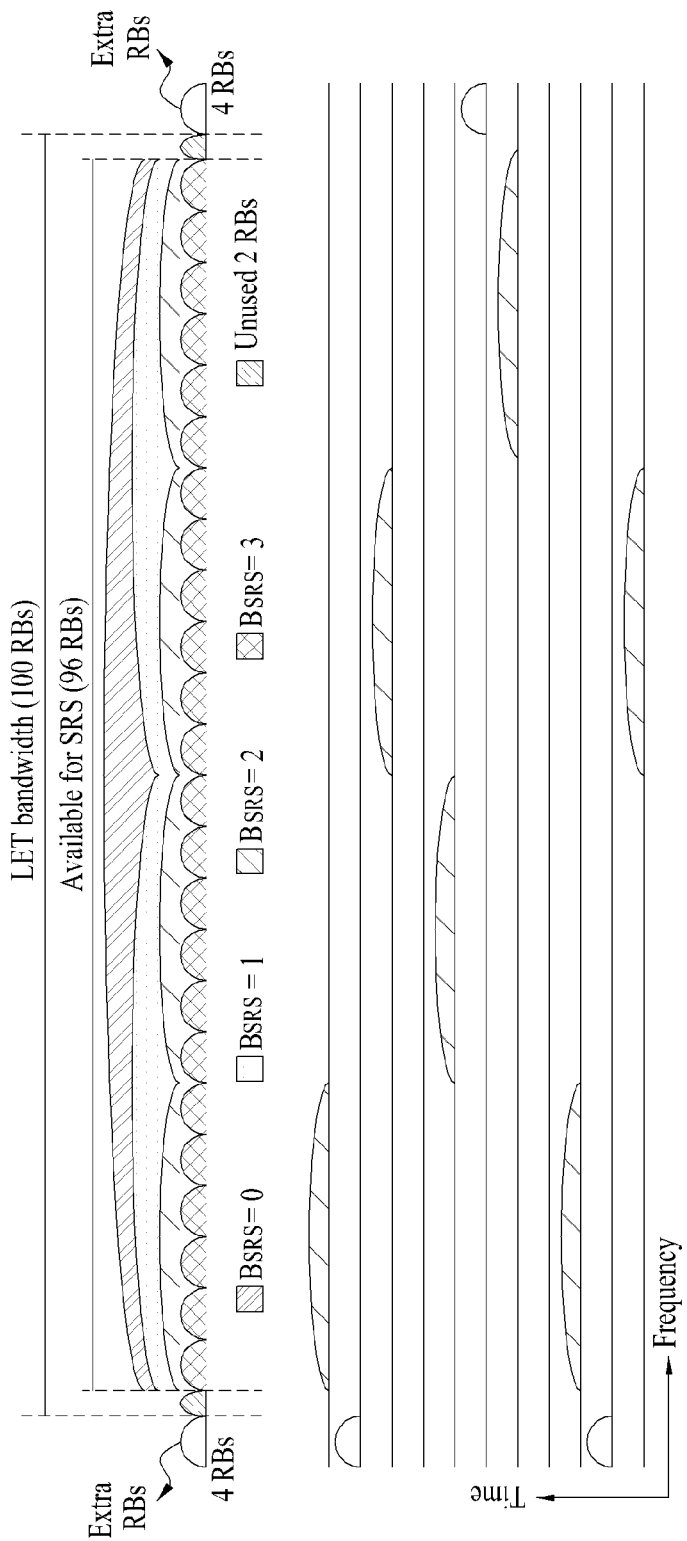
FIG. 20 illustrates another exemplary frequency bandwidth in which SRS transmission is performed from a resource region, wherein the frequency resource is extended, according to an exemplary embodiment of the present invention.
Figure 21:
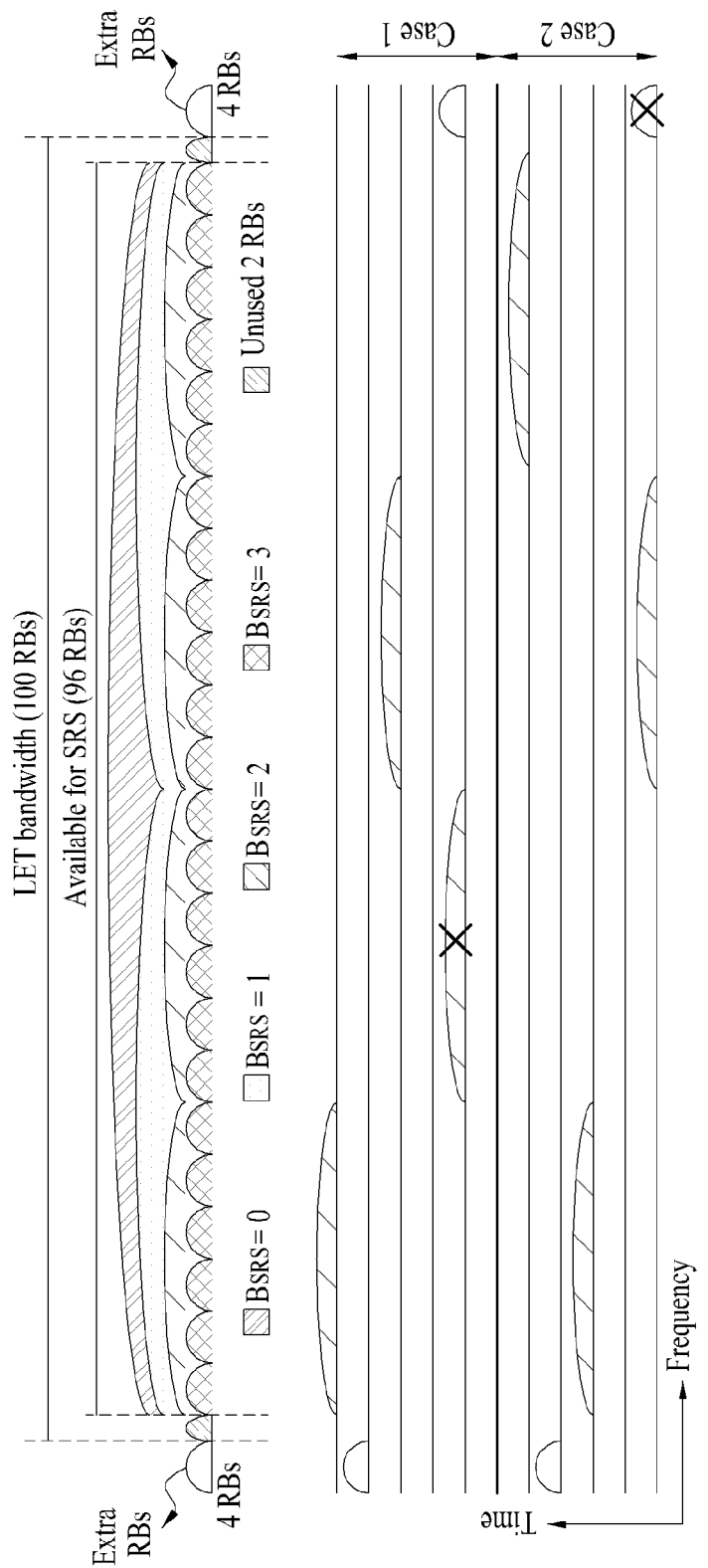
FIG. 21 illustrates yet another exemplary frequency bandwidth in which SRS transmission is performed from a resource region, wherein the frequency resource is extended, according to an exemplary embodiment of the present invention.

FIG. 20 and FIG. 21 illustrate other exemplary frequency bandwidths in which SRS transmission is performed from a resource region, wherein the frequency resource is extended, according to an exemplary embodiment of the present invention.

As described earlier in FIG. 18, referring to FIG. 20 and FIG. 21, 100 RBs are allocated to the LTE bandwidth, which corresponds to the legacy resource region, and 96 RBs are allocated to the SRS hopping bandwidth. And, in relation to the SRS bandwidth, it is assumed that, among the 8 SRS bandwidth sets, shown in Table 8, an SRS bandwidth being configured of 96 RBs, 48 RBs, 24 RBs, and 4 RBs, based upon the SRS bandwidth set of index 0, is being allocated.

At this point, the base station configures SRS configuration information related to the LTE bandwidth (SRS BW configuration #1) and, SRS configuration information related to the extended resource region (SRS BW configuration #2), and, then, the base station transmits the configured SRS configuration information to the user equipment via separate signaling. Therefore, the SRS transmission cycle period/offset value of each SRS respective to the LTE bandwidth and the extended resource region may be differently configured. Accordingly, the user equipment transmits the SRS via uplink, in accordance with the respective transmission cycle period, which is included in the SRS configuration information for the LTE bandwidth and the SRS configuration information for the extra RB. FIG. 20 shows an example of a case when inter-signal contention does not occur, due to a non-coincidence between the SRS transmission cycle period of an SRS bandwidth belonging to 24 RBs and the SRS transmission point of the extra RBs.

Conversely, as shown in FIG. 21, in case the SRS transmission cycle period of the SRS bandwidth coincides with the SRS transmission point of the extra RBs, in order to reduce the interference resulting from the inter-signal contention, the user equipment may drop any one of the SRSs in accordance with the predetermined dropping rule shown in Table 7.

For example, when an inter-signal contention occurs, a case of dropping the SRS having the shortest transmission, in accordance with the dropping rule, may be configured as case 1, and, a case of always dropping the extra RB may be configured as case 2.

According to the above-described embodiments of the present invention, the user equipment may perform subband CQI reporting and SRS transmission by using configuration information related to an uplink signal transmission from a legacy system over an extended frequency resource, or in accordance with configuration information, which is configured to be differentiated from the legacy configuration information.

Structures of an exemplary base station and an exemplary user equipment that can perform the above-described embodiment of the present invention will be described in detail with reference to FIG. 22.

Figure 22:
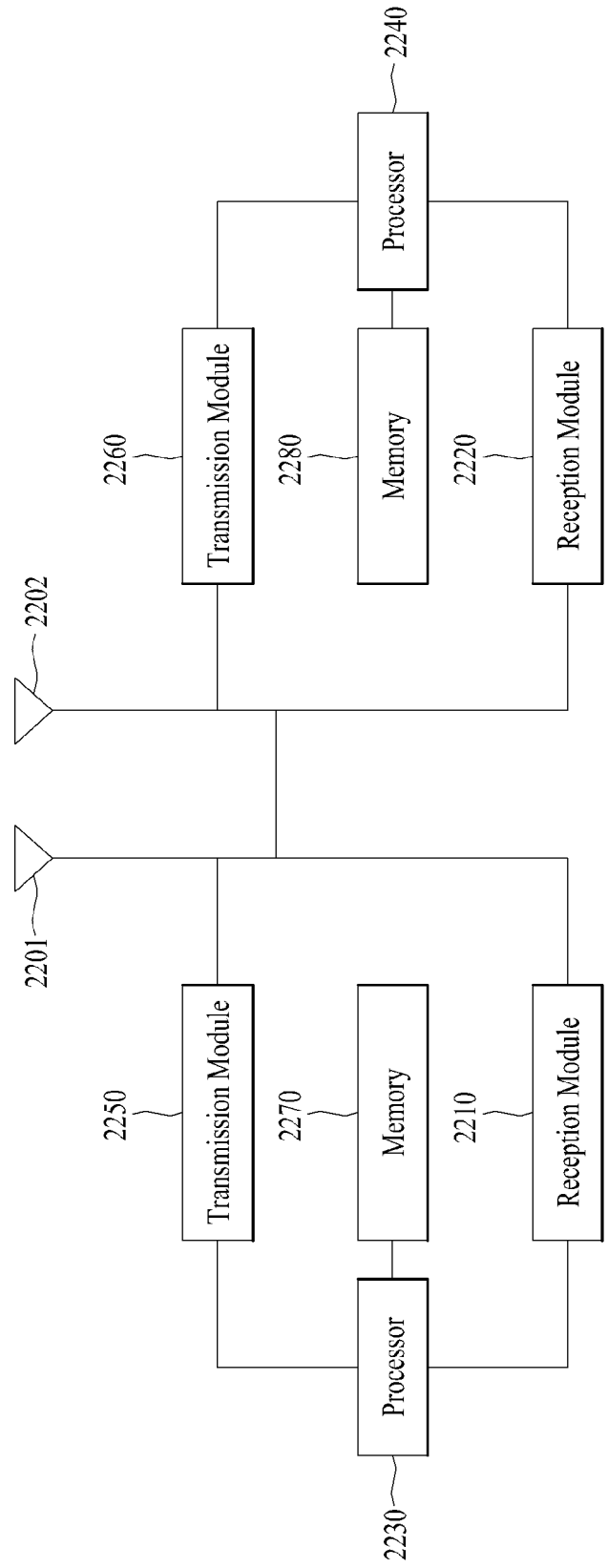
FIG. 22 illustrates a block view showing the structures of an exemplary base station and an exemplary user equipment that can perform the embodiment of the present invention.

FIG. 22 illustrates a block view showing the structures of an exemplary base station and an exemplary user equipment that can perform the embodiment of the present invention.

The user equipment may operate as a transmission device in an uplink and may operate as a reception device in a downlink. Also, the base station may operate as a reception device in an uplink and may operate as a transmission device in an uplink. More specifically, the user equipment and the base station may each include a transmission device and a reception device for transmitting information or data.

Each of the transmission device and the reception device may include a processor, a module, a part and/or means each configured to perform the exemplary embodiments of the present invention. Most particularly, the transmission device and the reception device may include a module (means) configured to encrypt a message, a module configured to translate an encrypted message, an antennae configured to transmit and receive a message, and so on.

Referring to FIG. 22, the left side represents the structure of the transmission device, which indicates a base station, and the right side represents the structure of the reception device, which indicates a user equipment accessing a cell that is serviced by the base station. Each of the transmission device and the reception device may include an antenna (2201, 2202), a reception module (2210, 2220), a processor (2230, 2240), a transmission module (2250, 2260), and a memory (2270, 2280).

The antenna (2201, 2202) is configured of a receiving antenna, which performs the functions of receiving a radio signal from an outside source and delivering the received signal to the reception module (2210, 2220), and a transmitting antenna, which performs the function of transmitting a signal generated from the transmission module (2250, 2260) to the outside source. When a multiple antenna (MIMO) function is supported, at least 2 or more antennae (2201, 2202) may be provided herein.

The reception module (2210, 2220) performs decoding and demodulation on the radio signal, which is received from the outside source through the antenna, so as to recover the received radio signal to an original data format, thereby delivering the processed data to the processor (2230, 2240). Instead of being separated from one another, as shown in FIG. 22, the reception module and antennae may also be illustrated as a receiving unit configured to receive radio signals.

The processor (2230, 2240) generally controls the overall operations of the transmission device or the reception device. More specifically, a controller function for performing the above-described exemplary embodiments of the present invention, a MAC (Medium Access Control) frame variable control function based upon service characteristics and frequency environment (or condition), a Hand Over function, and authentication and encoding (or encryption) functions may be performed.

The transmission module (2250, 2260) may perform predetermined coding and modulation processes on data, which are scheduled by the processor (2230, 2240) and to be transmitted to the outside source, thereby delivering the processed data to the antenna. Instead of being separated from one another, as shown in FIG. 21, the transmission module and antennae may also be illustrated as a transmitting unit configured to transmit radio signals.

A program for processing and controlling the processor (2230, 2240) may be stored in the memory (2270, 2280). The memory (2270, 2280) may also perform functions for temporarily storing input/output data (in case of a mobile user equipment, uplink grant (UL Grant) allocated from the base station, system information, station identifier (STID), flow identifier (FID)), operation time, and so on.

Furthermore, the memory (2270, 2280) may include at least one type of storage means, such as a flash memory type, a hard-disk type, a multimedia card micro type, a card-type memory (e.g., SD or XD memory, etc.), a Random Access Memory (RAM), a SRAM (Static Random Access Memory), a Read-Only Memory (ROM), an EEPROM (Electrically Erasable Programmable Read-Only Memory), a PROM (Programmable Read-Only Memory), a magnetic memory, a magnetic disk, and an optical disk.

The processor (2230) of the transmitting device performs overall control operations of the base station. And, the processor (2230) of the transmitting device may generate configuration information related to the CQI or SRS, which is transmitted via uplink from the legacy resource region in accordance with the above-described embodiments of the present invention, as shown in FIG. 13 to FIG. 21. Additionally, the processor (2230) of the transmitting device may also generate configuration information related to the CQI or SRS from the extended resource region. At this point, the CQI configuration information may correspond to information related to uplink signaling including CQI report cycle period/offset, subband size, a number of bandwidth parts, and a number of preferred subbands. And, the SRS configuration information may include information related to SRS transmission cycle period/offset, SRS BW configuration parameter, SRS BW, and SRS hopping BW.

In case the processor (2230) of the transmitting device configures a separate CQI or SRS configuration information with respect to the legacy resource region and the extended resource region, the CQI report cycle period/offset value or the SRS transmission cycle period/offset value may be configured to have the same value.

In this case, due to the coincidence in the transmission cycle period/offset value of the CQI, or the SRS of each resource region, the receiving system receiving the configuration information may transmit the CQI or SRS at the same time point, or a problem of inter-signal contention may occur. Therefore, when configuring a separate CQI or SRS configuration information with respect to the extended resource region, the processor (2230) of the transmitting device may decide a predetermined dropping rule for preventing contention with the CQI or SRS of the legacy resource region. Thereafter, the processor (2230) of the transmitting device may transmit the decided dropping rule to the receiving device.

Subsequently, the processor (2230) of the transmitting device may select a channel that is to be used based upon an uplink CQI, which is transmitted from the transmission module (2260) of the receiving device, or the processor (2230) of the transmitting device may receive an uplink SRS, so as to measure the quality of the corresponding channel.

The processor (2240) of the receiving device performs overall control operations of the user equipment, and the processor (2240) of the receiving device may be allocated with resources of a predetermined region from the transmitting device. At this point, the allocated resource region may include the legacy resource region as well as the extended resource region (e.g., segment or extra RB). Also, the receiving device receives configuration information related to the CQI or SRS transmission respective to the legacy resource region and/or the extended resource region from the transmitting device, and the receiving device may transmit the respective CQI or SRS via uplink. For example, the processor (2240) of the receiving device may apply the CQI or SRS configuration information of the legacy resource region to the CQI or SRS transmission of the extended resource region, or the processor (2240) of the receiving device may apply CQI or SRS configuration information of the extended resource region, which is received via separate signaling, so as to transmit a signal. At this point, due to the coincidence in the transmission point or transmission cycle period of the CQI or SRS, which is transmitted from each resource region that is differentiated from one another, when an interference occurs between the two signals, a predetermined dropping rule (e.g., Table 5 or Table 7), which is predetermined or transmitted from the base station, may be applied to as to prevent inter-signal contention from occurring.

As described above, the detailed description of the disclosed preferred embodiments of the present invention is provided so that anyone skilled in the art can realize and carry out the present invention. In the above description, although the present invention is described with reference to the preferred embodiments of the present invention, it will be apparent to those skilled in the art that various modifications and variations can be made in the present invention without departing from the spirit or scope of the inventions.

Therefore, the present invention is not intended to limit the present invention to the embodiments presented herein. Instead, it is intended that the present invention grants a broadest range matching the principles and new characteristics disclosed herein.

INDUSTRIAL APPLICABILITY

The exemplary embodiment of the present invention may be applied in diverse radio access systems. Examples of the diverse radio access systems may include 3GPP (3rd Generation Partnership Project), 3GPP2, and/or IEEE 802.xx (Institute of Electrical and Electronic Engineers 802) systems. In addition to the diverse radio access systems, the exemplary embodiments of the present invention may also be applied to all technical fields adopting the diverse radio access systems.

What is claimed is:

1. A method for transmitting by a user equipment control information for a downlink component carrier having a specific bandwidth in a wireless communication system, wherein the downlink component carrier comprises a system band in a middle of the specific bandwidth and a segment band on either side of the specific bandwidth in a frequency domain, the method comprising:
    receiving, from a base station, first configuration information related to first channel quality information for at least portion of the system band;
    receiving, from the base station, second configuration information related to second channel quality information for the segment band;
    transmitting the first channel quality information to the base station based upon the first configuration information; and
    transmitting the second channel quality information to the base station based upon the second configuration information,
    wherein, when a transmission timing of the first channel quality information coincides with a transmission timing of the second channel quality information, one of the first and second channel quality information is dropped.

2. The method of claim 1, wherein, when a transmission timing of the first channel quality information coincides with a transmission timing of the second channel quality information, the second channel quality information is dropped.

3. The method of claim 1, wherein, when a transmission timing of the first channel quality information coincides with a transmission timing of the second channel quality information, channel quality information for a smaller frequency band is dropped.

4. The method of claim 1, wherein, when a transmission timing of the first channel quality information coincides with a transmission timing of the second channel quality information, channel quality information with a smaller transmission cycle period is dropped.

5. The method of claim 1, wherein, when a transmission timing of the first channel quality information coincides with a transmission timing of the second channel quality information, each channel quality information is alternately dropped per each subframe.

6. A method for transmitting by a user equipment control information for a downlink component carrier having a specific bandwidth in a wireless communication system, the method comprising:
    receiving, from a base station, first configuration information related to first channel quality information for the system band;
    transmitting the first channel quality information to the base station based upon the first configuration information; and
    optionally transmitting second channel quality information for the segment band to the base station by applying the first configuration information,
    wherein, when a transmission timing of the first channel quality information coincides with a transmission timing of the second channel quality information and the at least portion of the system band is adjacent to the segment band, the first and second channel quality information are transmitted at the same time.

7. The method of claim 6, further comprising:
    when the first and second channel quality information are transmitted at the same time, transmitting index information of a subband of the at least portion of the system band to the base station.

8. A method for transmitting by a user equipment reference signals for a uplink component carrier having a specific bandwidth in a wireless communication system, wherein the uplink component carrier comprises a system band in a middle of the specific bandwidth and a segment band on either side of the specific bandwidth in a frequency domain, the method comprising:
    receiving, from the base station, first configuration information related to a first reference signal for at least portion of the system band;
    receiving, from the base station, second configuration information related to a second reference signal for the segment band;

transmitting the first reference signal to the base station based upon the first configuration information; and transmitting the second reference signal to the base station based upon the second configuration information, wherein, when a transmission timing of the first reference signal coincides with a transmission timing of the second reference signal, one of the first and second reference signals is dropped.

9. The method of claim 8, wherein, when a transmission timing of the first reference signal coincides with a transmission timing of the second reference signal, the second reference signal is dropped.

10. The method of claim 8, wherein, when a transmission timing of the first reference signal coincides with a transmission timing of the second reference signal, a reference signal for a smaller frequency band is dropped.

11. The method of claim 8, wherein, based upon the predetermined dropping rule, when a transmission timing of the first reference signal coincides with a transmission timing of the second reference signal, a reference signal having a smaller transmission cycle period is dropped.

12. The method of claim 8, wherein, when a transmission timing of the first reference signal coincides with a transmission timing of the second reference signal, each reference signal is alternately dropped per each subframe.

13. A method for transmitting by a user equipment reference signals for a uplink component carrier having a specific bandwidth in a wireless communication system, wherein the uplink component carrier comprises a system band in a middle of the specific bandwidth and a segment band on either side of the specific bandwidth in a frequency domain, the method comprising:

receiving, from a base station, first configuration information for transmitting a first reference signal for at least portion of the system band;

transmitting the first reference signal to the base station based upon the first configuration information; and optionally transmitting a second reference signal for the segment band to the base station by applying the first configuration information, wherein, when a transmission timing of the first channel quality information coincides with a transmission timing of the second channel quality information and the at least portion of the system band is adjacent to the segment band, the first and second reference signals are transmitted at the same time.

14. A user equipment for transmitting control information for a downlink component carrier having a specific bandwidth in a wireless communication system, wherein the downlink component carrier comprises a system band in a middle of the specific bandwidth and a segment band on either side of the specific bandwidth in a frequency domain, the user equipment comprising:

a reception module configured to receive a radio signal;

a transmission module configured to transmit a radio signal; and a processor configured to:

receive, from a base station, first configuration information relate to first channel quality information for at least portion of the system band, receive, from the base station, second configuration information related to second channel quality information for the segment band, transmit the first channel quality information to the base station based upon the first configuration information, and transmit the second channel quality information to the base station based upon the second configuration information, wherein, when a transmission timing of the first channel quality information coincides with a transmission timing of the second channel quality information, one of the first and second channel quality information is dropped.

15. A user equipment for transmitting control information for a uplink component carrier having a specific bandwidth in a wireless communication system, wherein the uplink component carrier comprises a system band in a middle of the specific bandwidth and a segment band on either side of the specific bandwidth in a frequency domain, the user equipment comprising:

a reception module configured to receive a radio signal;

a transmission module configured to transmit a radio signal; and a processor configured to:

receive, from the base station, first configuration information related to a first reference signal for at least portion of the system band, receive, from the base station, second configuration information related to a second reference signal for the segment band, transmit the first reference signal to the base station based upon the first configuration information, and transmit the second reference signal to the base station based upon the second configuration information, wherein, when a transmission timing of the first reference signal coincides with a transmission timing of the second reference signal, one of the first and second reference signals is dropped.

* * * * *